US012574120B2

(12) United States Patent
Noguchi

(10) Patent No.: US 12,574,120 B2
(45) Date of Patent: Mar. 10, 2026

(54) OPTICAL RELAY APPARATUS, OPTICAL TRANSMISSION SYSTEM, AND OPTICAL RELAY METHOD

(71) Applicant: NEC Corporation, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 251 days.

(21) Appl. No.: 18/277,732

(22) PCT Filed: Feb. 26, 2021

(86) PCT No.: PCT/JP2021/007555
§ 371 (c)(1),
(2) Date: Aug. 17, 2023

(87) PCT Pub. No.: WO2022/180846
PCT Pub. Date: Sep. 1, 2022

(65) Prior Publication Data
US 2024/0129041 A1     Apr. 18, 2024

(51) Int. Cl.
*H04B 10/532* (2013.01)
*H04B 10/40* (2013.01)
*H04B 10/61* (2013.01)

(52) U.S. Cl.
CPC ........... *H04B 10/532* (2013.01); *H04B 10/40* (2013.01); *H04B 10/6162* (2013.01)

(58) Field of Classification Search
CPC ... H04B 10/40; H04B 10/532; H04B 10/6162
(Continued)

(56) References Cited

U.S. PATENT DOCUMENTS

| | | | |
|---|---|---|---|
| 10,348,410 B1 * | 7/2019 | Charlton | H04B 10/0795 |
| 2012/0177386 A1 * | 7/2012 | Zhou | H04B 10/2543 |
| | | | 398/208 |

(Continued)

FOREIGN PATENT DOCUMENTS

| | | |
|---|---|---|
| EP | 2903184 A1 | 8/2015 |
| JP | H09-186657 A | 7/1997 |

(Continued)

OTHER PUBLICATIONS

International Search Report for PCT Application No. PCT/JP2021/007555, mailed on May 18, 2021.

*Primary Examiner* — Dalzid E Singh
(74) *Attorney, Agent, or Firm* — Sughrue Mion, PLLC

(57) ABSTRACT

An optical transceiver (101) of an optical relay apparatus includes: a coherent reception front-end unit (110) that coherently detects an input optical signal to be input, based on local oscillation light, and outputs the coherently detected first analog electric signal; a coherent transmission front-end unit (120) that coherently modulates a second analog electric signal acquired by turning around the first analog electric signal, based on transmission light, and outputs the coherently modulated output optical signal; and an analog compensation unit (130) that performs analog signal processing on the first analog electric signal in such a way as to compensate for signal quality according to a signal characteristic between an input of the coherent reception front-end unit (110) and an output of the coherent transmission front-end unit (120), and thereby generates the second analog electric signal.

19 Claims, 32 Drawing Sheets

(58) Field of Classification Search
USPC .......................................................... 398/184
See application file for complete search history.

(56) References Cited

U.S. PATENT DOCUMENTS

| | | | |
|---|---|---|---|
| 2015/0222369 A1 | 8/2015 | Olsson et al. | |
| 2016/0105238 A1* | 4/2016 | Huang .................. | H04B 10/29 |
| | | | 398/184 |

FOREIGN PATENT DOCUMENTS

| | | |
|---|---|---|
| JP | 2017-511036 A | 4/2017 |
| WO | 2014/012592 A1 | 1/2014 |

* cited by examiner

101

301

WITHOUT FREQUENCY OFFSET

WITH FREQUENCY OFFSET

WITHOUT FREQUENCY OFFSET

WITH FREQUENCY OFFSET

WITH SKEW

WITHOUT SKEW

WITH SKEW

WITHOUT SKEW

WITH SKEW

WITHOUT SKEW

OPTICAL RELAY APPARATUS, OPTICAL TRANSMISSION SYSTEM, AND OPTICAL RELAY METHOD

This application is a National Stage Entry of PCT/JP2021/ 007555 filed on Feb. 26, 2021, the contents of all of which are incorporated herein by reference, in their entirety.

TECHNICAL FIELD

The present invention relates to an optical relay apparatus, an optical transmission system, and an optical relay method.

BACKGROUND ART

In recent years, introduction of a 5G wireless communication system has been promoted, and towards the post-5G era, demands for further ultra-low delay and multiple simultaneous connection in addition to ultra-high speed in not only wireless communication but also optical communication fields have been intensified. For this reason, an optical communication system is expected to be utilized for various communication services and industrial applications, and research is being advanced.

For example, in a backbone optical communication system, a digital coherent method in which an optical phase modulation method and a polarization demultiplexing technique are combined is used, whereby a large capacity of more than 100 Giga bit per second (Gbps) is achieved. In addition, a transmission method also has been researched and developed in which a signal-band is narrowed and wavelength-multiplexed (Wavelength Division Multiplexing: WDM), thereby improving frequency utilization efficiency and enabling multiple simultaneous connection.

As a related technique, for example, Patent Literature 1 is known. Patent Literature 1 discloses a wavelength converter that converts a wavelength of an optical signal by a receiving end and a transmitting end using a coherent method.

CITATION LIST

Patent Literature

[Patent Literature 1] Published Japanese Translation of PCT International Publication for Patent Application, No. 2017-511036

SUMMARY OF INVENTION

Technical Problem

In Patent Literature 1, in a wavelength converter, a receiving end including a coherent detection front-end module converts a received optical signal into an analog electric signal, and a transmitting end including an optical modulation module converts the analog electric signal into a transmitted optical signal. However, Patent Literature 1 does not consider deterioration in quality of an optical signal caused by passing through a plurality of optical relay apparatuses, and the like. Namely, in Patent Literature 1, since only the optical signal is converted into an analog electric signal and the analog electric signal is further converted into an optical signal, there is a problem that signal quality may be deteriorated.

In view of such a problem, an object of the present disclosure is to provide an optical relay apparatus, an optical transmission system, and an optical relay method that are capable of suppressing deterioration in signal quality.

Solution to Problem

An optical relay apparatus according to the present disclosure includes: a coherent optical reception front-end means for coherently detecting an input optical signal to be input, based on local oscillation light, and outputting the coherently detected first analog electric signal; a coherent optical transmission front-end means for coherently modulating a second analog electric signal acquired by turning around the first analog electric signal, based on transmission light, and outputting the coherently modulated output optical signal; and an analog compensation means for performing analog signal processing on the first analog electric signal in such a way as to compensate for signal quality according to a signal characteristic between an input of the coherent optical reception front-end means and an output of the coherent optical transmission front-end means, and thereby generating the second analog electric signal.

An optical transmission system according to the present disclosure includes a plurality of optical relay apparatuses, the plurality of optical relay apparatuses including: a coherent optical reception front-end means for coherently detecting an input optical signal to be input from the optical relay apparatus in a preceding stage, based on local oscillation light, and outputting the coherently detected first analog electric signal; a coherent optical transmission front-end means for coherently modulating a second analog electric signal acquired by turning around the first analog electric signal, based on transmission light, and outputting the coherently modulated output optical signal to the optical relay apparatus in a next stage; and an analog compensation means for performing analog signal processing on the first analog electric signal in such a way as to compensate for signal quality according to a signal characteristic between an input of the coherent optical reception front-end means and an output of the coherent optical transmission front-end means, and thereby generating the second analog electric signal.

An optical relay method according to the present disclosure is an optical relay method in an optical relay apparatus including a coherent optical reception front-end means and a coherent optical transmission front-end means, the optical relay method including: by the coherent optical reception front-end means, coherently detecting an input optical signal to be input, based on local oscillation light, and outputting the coherently detected first analog electric signal; by the coherent optical transmission front-end means, coherently modulating a second analog electric signal acquired by turning around the first analog electric signal, based on transmission light, and outputting the coherently modulated output optical signal; and performing analog signal processing on the first analog electric signal in such a way as to compensate for signal quality according to a signal characteristic between an input of the coherent optical reception front-end means and an output of the coherent optical transmission front-end means, thereby generating the second analog electric signal.

Advantageous Effects of Invention

According to the present disclosure, it is possible to provide an optical relay apparatus, an optical transmission system, and an optical relay method that are capable of suppressing deterioration in signal quality.

BRIEF DESCRIPTION OF DRAWINGS

FIG. 23 is a configuration diagram illustrating an example of a configuration of an optical transceiver according to a modified example of the third example embodiment;

FIG. 24 is a configuration diagram illustrating an example of a configuration of a frequency offset monitor according to the modified example of the third example embodiment;

EXAMPLE EMBODIMENT

Figure 1:
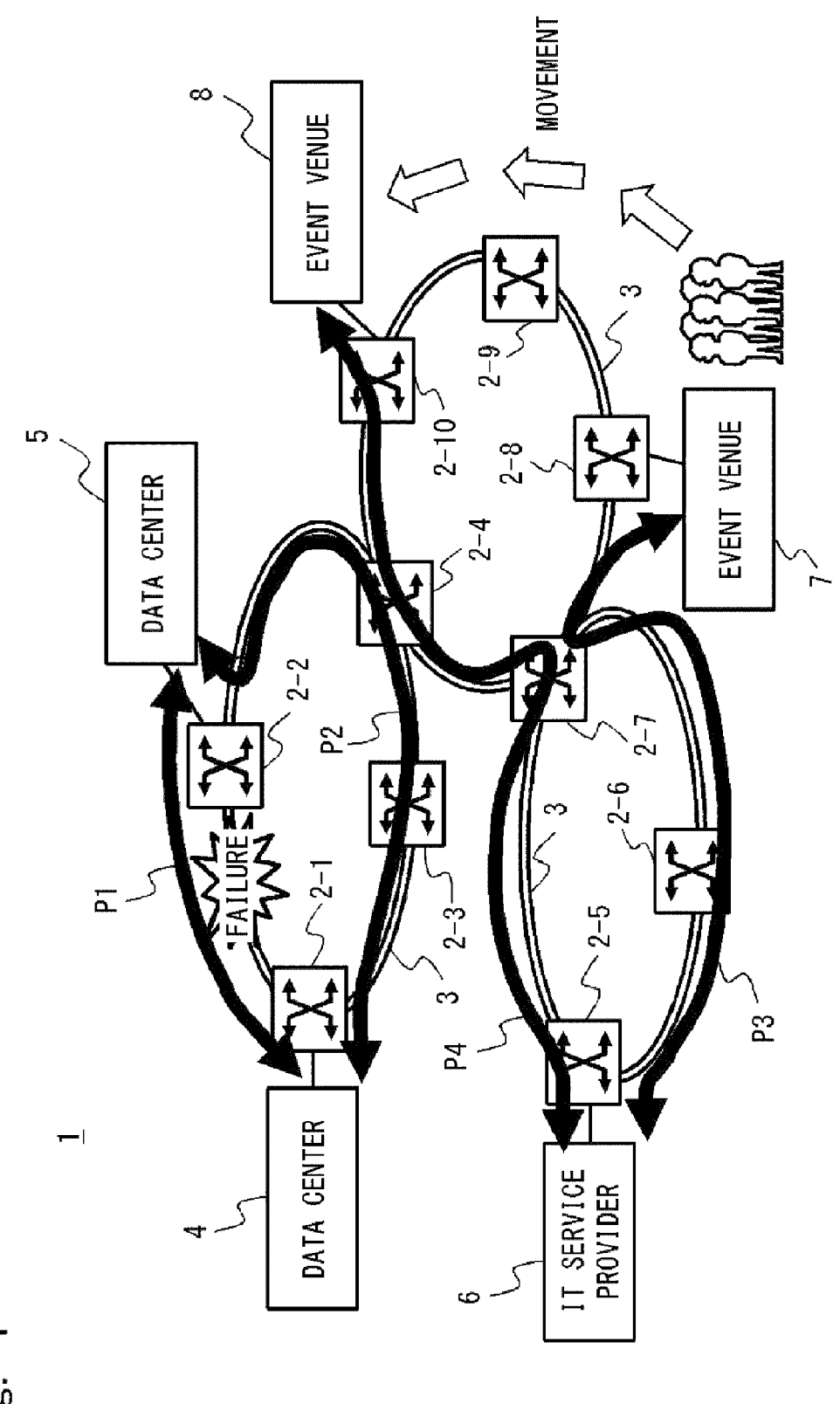
FIG. 1 is a configuration diagram illustrating an example of a configuration of an optical transmission system according to a first example embodiment.

Hereinafter, example embodiments will be explained with reference to the drawings. In the drawings, the same elements are denoted by the same reference numerals, and redundant explanations are omitted as necessary. Note that arrows attached in the configuration diagram (block diagram) are examples for explanation, and do not limit a type or direction of a signal.

First Example Embodiment

Hereinafter, a first example embodiment will be explained with reference to the drawings. FIG. 1 illustrates an example of a configuration of an optical transmission system according to the present example embodiment. An optical transmission system 1 according to the present example embodiment is, for example, a backbone wavelength multiplexing optical transmission system, and performs high-capacity communication exceeding 100 Gbps by performing wavelength multiplexing and performing digital coherent transmission on optical signals of wavelengths. By wavelength multiplexing, it is possible to improve frequency utilization efficiency of light, and it is possible to cope with mobile traffic and wavelength defragmentation. In addition, since a transmission route (wavelength path) can be flexibly switched as an optical signal by wavelength multiplexing, by switching the transmission route in the event of a failure, it is possible to avoid the failure and to maintain the infrastructure. Further, in the present example embodiment, real-time performance is improved toward the post-5G era, and it is possible to cope with an ultra-low latency.

As illustrated in FIG. 1, the optical transmission system 1 includes a plurality of optical relay apparatuses 2 (for example, 2-1 to 2-10) that are connected to each other via an optical fiber transmission line 3 in such a way as to be capable of optical communication. The optical relay apparatus 2 is a photonic node capable of relaying a wavelength-multiplexed optical signal, and is, for example, a Reconfigurable Optical Add/Drop Multiplexer (ROADM) device. In this example, the optical relay apparatuses 2-1 to 2-10 constitute a ring-type network including three rings, but may constitute a network of other topologies.

A wavelength path is allocated to each optical relay apparatus 2, and a local network to be accommodated or traffic of another optical relay apparatus 2 is transferred via the allocated wavelength path. For example, the optical relay apparatus 2-1 accommodates a network of a data center 4, and the optical relay apparatus 2-2 accommodates a network of a data center 5, and large-capacity traffic such as a video distribution service that distributes high-quality video (4 k/8 k) is transferred. When a failure occurs in the wavelength path P1 while the optical relay apparatus 2-1 and the optical relay apparatus 2-2 are transferring traffic between the data center 4 and the data center 5 via a wavelength path P1, the wavelength path P1 is switched to a wavelength path P2. As a result, it is possible to maintain the transfer of traffic between the data center 4 and the data center 5 via a detour route including the optical relay apparatus 2-3 and the optical relay apparatus 2-4.

For example, the optical relay apparatus 2-5 accommodates an IoT sensor network of an IT service provider 6, and the optical relay apparatus 2-8 accommodates a mobile network of an event venue 7. Traffic of the mobile network is traffic of spot demand by moving users. When a user of the event venue 7 moves to an event venue 8 while the optical relay apparatus 2-5 and the optical relay apparatus 2-8 are transferring traffic between the IT service provider 6 and the event venue 7 via a wavelength path P3 including the optical relay apparatus 2-6 and the optical relay apparatus 2-7, the wavelength path P3 is switched to a wavelength path P4. Accordingly, it is possible to maintain the transfer of the traffic of the user who has moved to the event venue 8 via the optical relay apparatus 2-6, the optical relay apparatus 2-4, and the optical relay apparatus 2-10.

Figure 2:
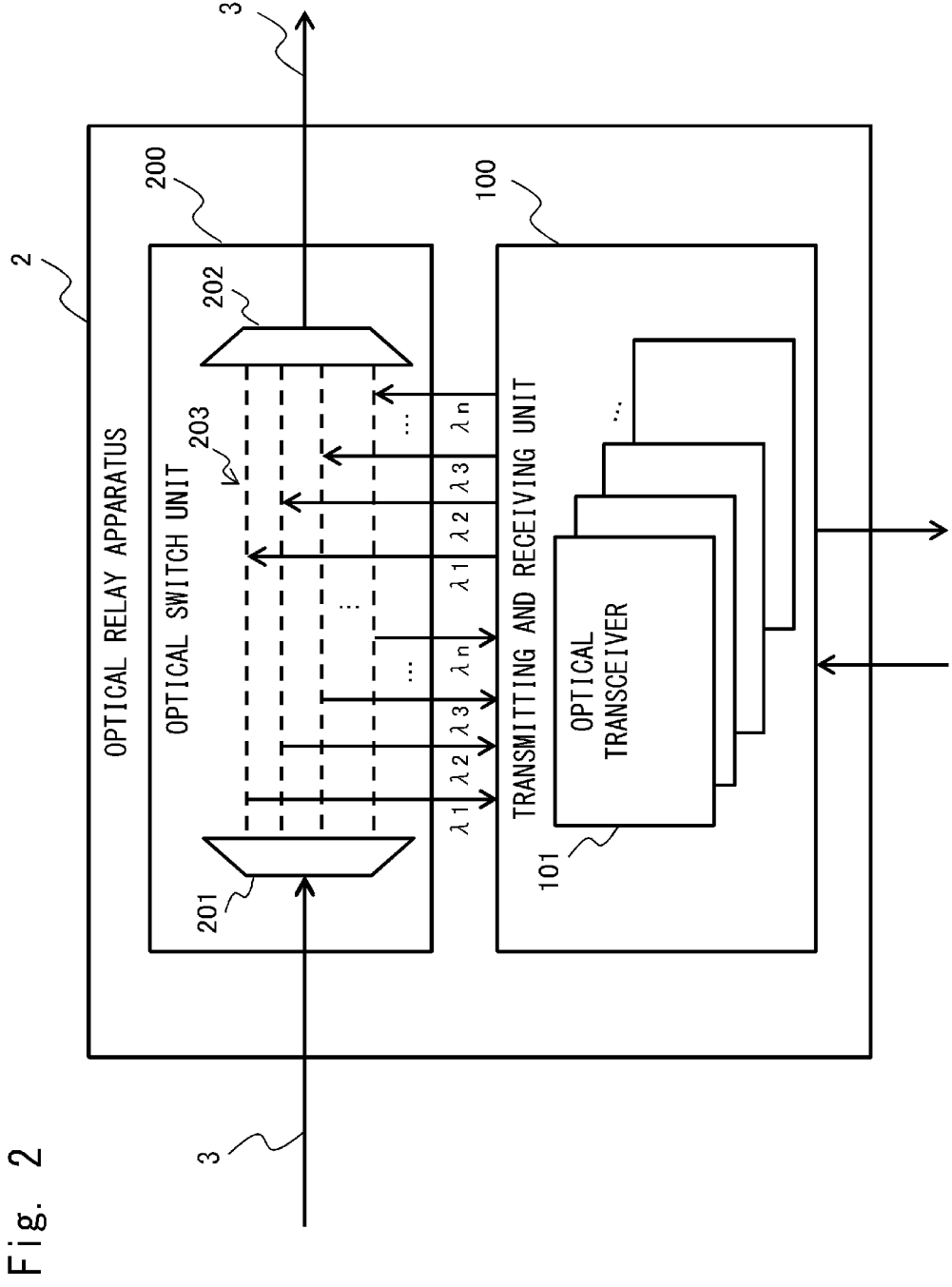
FIG. 2 is a configuration diagram illustrating an example of a configuration of an optical relay apparatus according to the first example embodiment.

FIG. 2 illustrates an example of a configuration of the optical relay apparatus 2 according to the present example embodiment. The optical relay apparatus 2 branches/inserts a wavelength multiplexed signal, and coherently modulates and demodulates a signal of each wavelength to be branched/inserted. As illustrated in FIG. 2, the optical relay apparatus 2 includes a transmitting/receiving unit 100 and an optical switch unit 200.

The optical switch unit 200 transfers an optical signal of a predetermined wavelength path to be received from the optical relay apparatus 2 of the preceding stage to the optical relay apparatus 2 of a subsequent stage in the optical transmission system 1, and branches/inserts the optical signal to be received for each wavelength. For example, the optical switch unit 200 includes a demultiplexer 201, a multiplexer 202, and a branch insertion unit 203. The demultiplexer 201 separates the optical signal received from the optical fiber transmission line 3 into optical signals of a plurality of wavelengths. The multiplexer 202 multiplexes optical signals of a plurality of wavelengths into one optical signal and transmits the optical signal to the optical fiber transmission line 3. The branch insertion unit (add/drop unit) 203 branches/inserts optical signals of wavelengths between the demultiplexer 201 and the multiplexer 202.

The transmitting/receiving unit (transponder) 100 receives the optical signal of each wavelength branched from the branch insertion unit 203 of the optical switch unit 200, outputs reception data that have been coherently demodulated to a local apparatus (network), inputs transmission data from the local apparatus, and transmits (inserts) the optical signal of each wavelength that have been coherently modulated to the branch insertion unit 203 of the optical switch unit 200. The transmitting/receiving unit 100 includes a plurality of optical transceivers 101 that transmit and receive optical signals of wavelengths. The optical transceiver 101 receives an optical signal of a predetermined wavelength, and further transmits an optical signal of a predetermined wavelength (a wavelength that is the same as or different from a reception wavelength).

Figure 3:
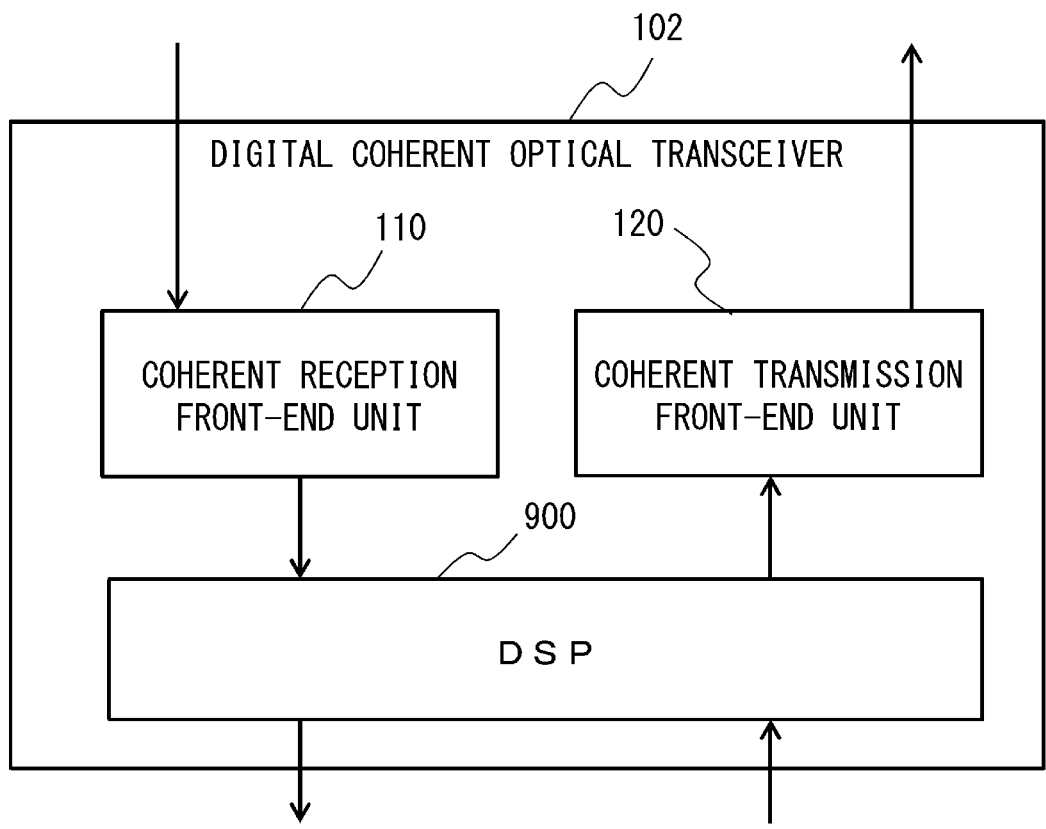
FIG. 3 is a configuration diagram illustrating an example of a configuration of a related digital coherent optical transceiver.

Herein, a problem that occurs when a digital coherent optical transceiver is used as the optical transceiver 101 will be discussed. FIG. 3 illustrates an example of a configuration of a related digital coherent optical transceiver. As illustrated in FIG. 3, a related digital coherent optical transceiver 102 includes a coherent reception front-end unit 110, a coherent transmission front-end unit 120, and a DSP 900.

The coherent reception front-end unit 110 coherently detects the optical signal received from the optical relay apparatus 2 of the preceding stage by local oscillation light (locally oscillated light: Local oscillator (LO) light) of a predetermined wavelength, and outputs the detected signal to the DSP 900. The coherent transmission front-end unit 120 performs optical modulation (coherent modulation) on the signal processed by the DSP 900 to a predetermined wavelength, and transmits the generated optical signal to the optical relay apparatus 2 of a next stage. The DSP 900 converts the signal coherently detected by the coherent reception front-end unit 110 into a digital signal, outputs the decoded reception data, encodes the input transmission data, and outputs the converted signal for optical modulation to the coherent transmission front-end unit 120.

Figure 4:
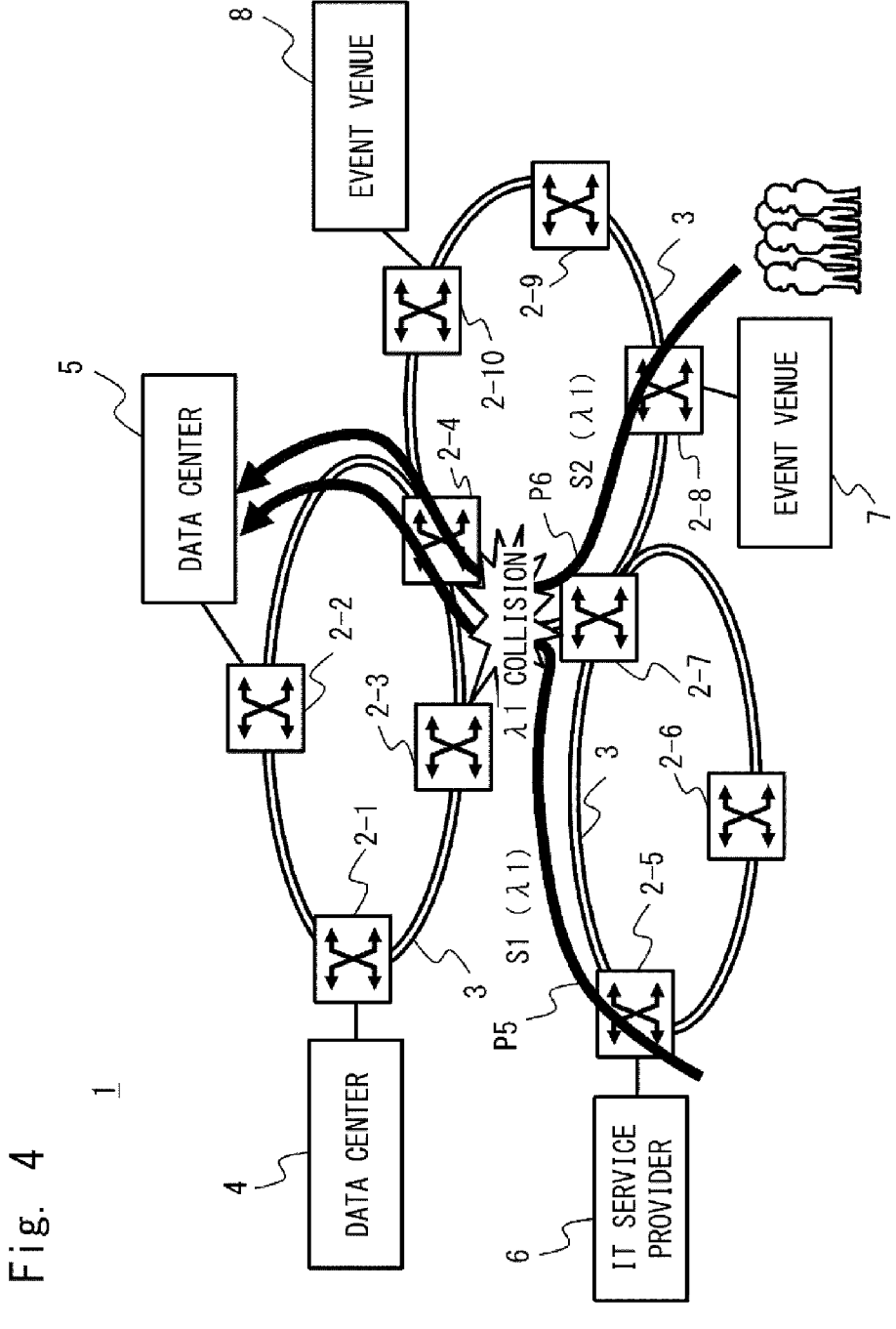
FIG. 4 is a diagram for explaining a problem of the related digital coherent optical transceiver.

When the optical relay apparatus 2 using such a digital coherent optical transceiver 102 relays an optical signal, as illustrated in FIG. 4, a case where optical signals of the same wavelength collide will be considered. For example, when a wavelength path P5 is set between the optical relay apparatus 2-2 and the optical relay apparatus 2-5 and traffic is transferred between the IT service provider 6 and the data center 5, a wavelength path P6 is set between the optical relay apparatus 2-2 and the optical relay apparatus 2-8, and traffic is transferred between the event venue 7 and the data center 5. At this time, when wavelength slots of the wavelength path P5 and the wavelength path P6 are λ1, an optical signal S1 of the wavelength path P5 and an optical signal S2 of the wavelength path P6 collide with each other in the optical relay apparatus 2-7.

In this case, a method of avoiding the collision by switching the wavelength path P5 or the wavelength path P6 to another route is also conceivable, but a wavelength slot of another route is not always empty. Even supposing that the path is switched, there is a possibility that latency increases due to the detour path. In the optical switch of the optical relay apparatus, a method of collectively switching a plurality of wavelengths as an optical signal in a wavelength grid unit including a plurality of wavelength slots (wavelength channels) is also conceivable, but in this case, it is not possible to switch in a wavelength unit.

Figure 5:
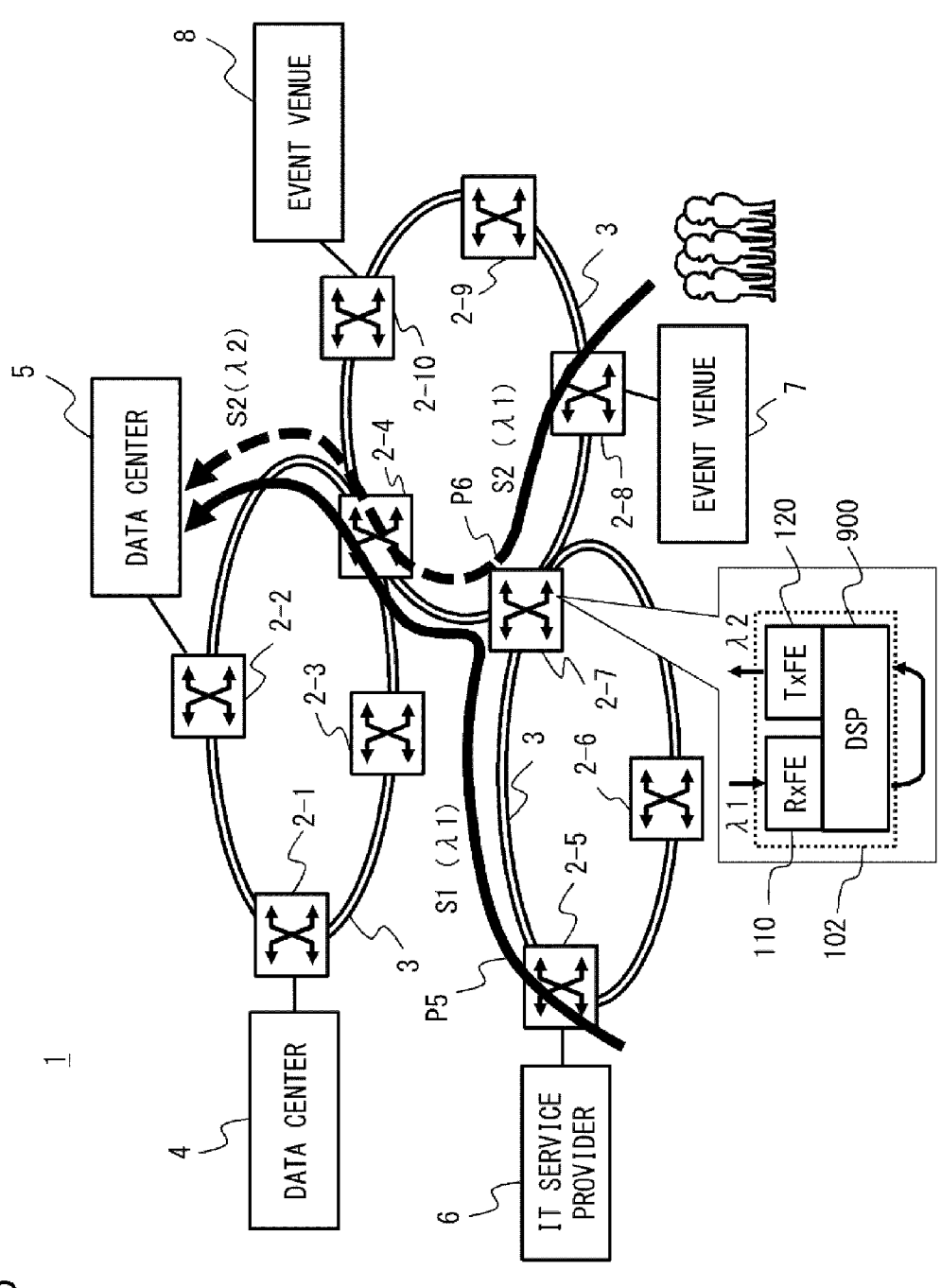
FIG. 5 is a diagram for explaining a problem of the related digital coherent optical transceiver.

Therefore, as illustrated in FIG. 5, a method of converting an optical signal into an empty wavelength slot in the optical relay apparatus 2-7 in which a collision occurs is conceivable. For example, in the digital coherent optical transceiver 102 of the optical relay apparatus 2-7, the wavelength of the optical signal in the wavelength path P6 is converted from λ1 to λ2. Thus, in a route from the optical relay apparatus 2-7 to the optical relay apparatus 2-2, since the wavelengths of the optical signal S1 of the wavelength path P5 and the optical signal S2 of the wavelength path P6 are different, collision can be avoided.

However, in the case of FIG. 5, there is a problem that latency increases because reproduction relay is performed when the digital coherent optical transceiver 102 performs the wavelength conversion and turns around the optical signal. Namely, since the DSP 900 of the digital coherent optical transceiver 102 performs complicated digital signal processing and error correction processing, the latency becomes large. In addition, a circuit size for digital signal processing is large, and power consumption is also large.

Figure 6:
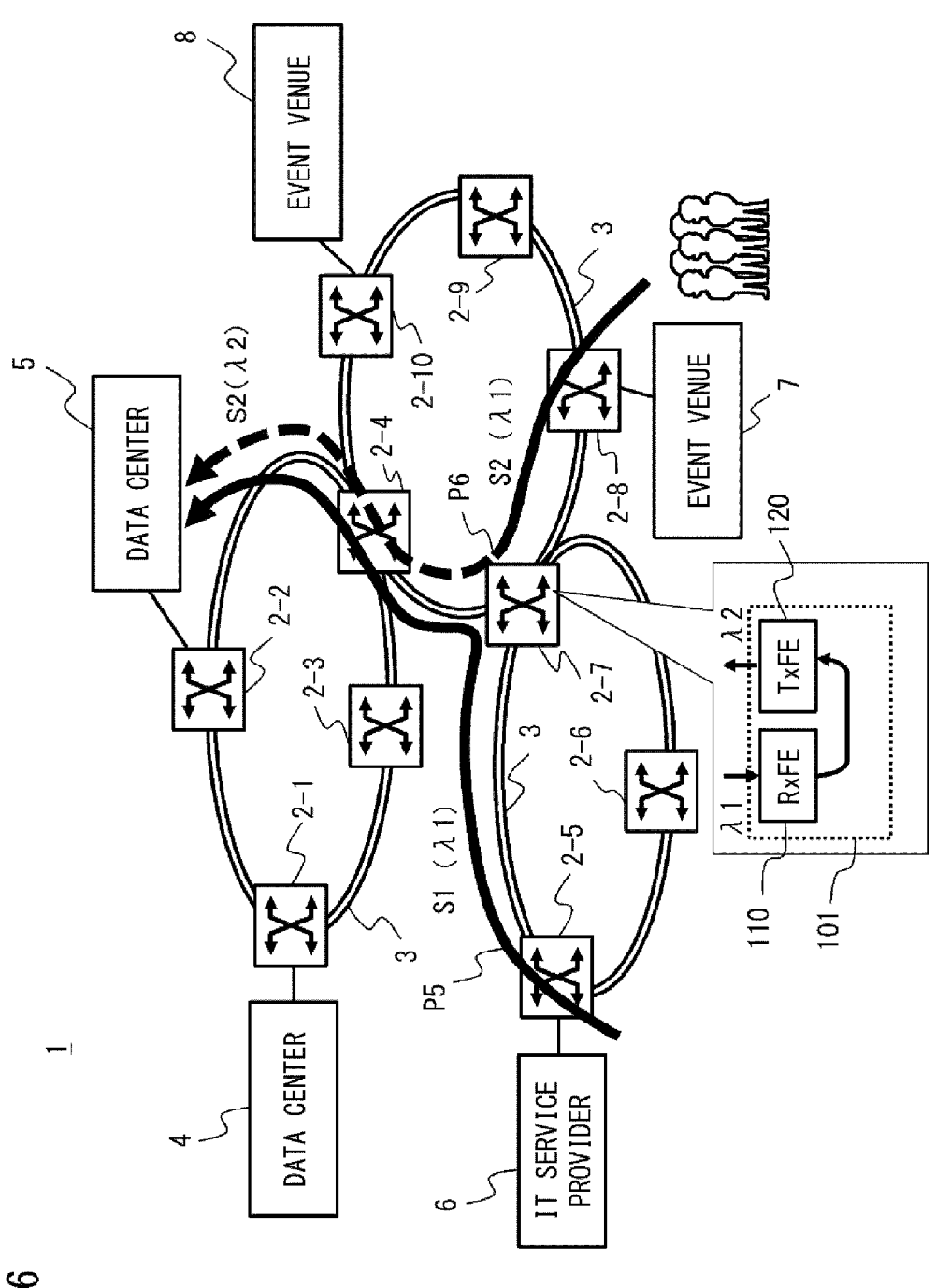
FIG. 6 is a diagram for explaining an outline of the optical relay apparatus according to the first example embodiment.

Therefore, in the present example embodiment, in the optical transceiver 101, an increase in latency is suppressed by turning around an optical signal without using a digital coherent optical transceiver. As illustrated in FIG. 6, in the present example embodiment, in the optical transceiver 101, the analog signal being output from the coherent reception front-end unit 110 is turned around and relayed to the coherent transmission front-end unit 120 without through the DSP (before the DSP). Note that the optical transceiver 101 may not include a DSP, or may not use a DSP when an optical signal is turned around. By not including the DSP, the circuit size of the optical transceiver 101 can be reduced.

Figure 7:
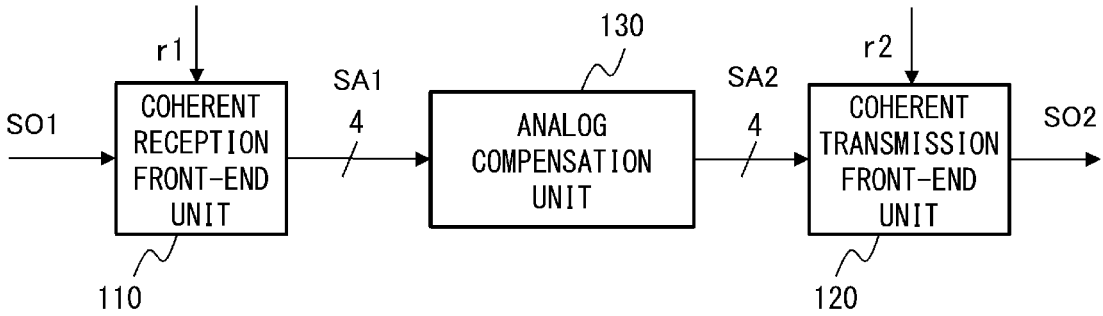
FIG. 7 is a configuration diagram illustrating an example of a configuration of an optical transceiver according to the first example embodiment.

FIG. 7 illustrates an example of a configuration of the optical transceiver 101 according to the present example embodiment. As illustrated in FIG. 7, the optical transceiver 101 (optical relay apparatus) according to the present example embodiment includes a coherent reception front-end unit 110, a coherent transmission front-end unit 120, and an analog compensation unit 130.

The coherent reception front-end unit 110 and the coherent transmission front-end unit 120 are similar to the digital coherent optical transceiver 102 described above. Namely, the coherent reception front-end unit 110 is an optical/electric conversion unit that converts an optical signal into an electric signal, and is a coherent detection unit that performs coherent detection. The coherent reception front-end unit 110 coherently detects an input optical signal SO1 to be input, based on local oscillation light r1, and outputs a generated analog electric signal SA1 (first analog electric signal).

The coherent transmission front-end unit 120 is an electric/optical conversion unit that converts an electric signal into an optical signal, and is a coherent modulation unit that performs coherent modulation. The coherent transmission front-end unit 120 performs coherent modulation on an analog electric signal SA2 (second analog electric signal) acquired by turning around the analog electric signal SA1, based on transmission light r2, and outputs a generated output optical signal SO2.

The input optical signal SO1 and the output optical signal SO2 are phase-modulated and polarization-multiplexed optical signals. The analog electric signals SA1 and SA2 are four lanes (4 ch) of signals including an XI signal of an I component (in-phase component) of an X polarization, an XQ signal of a Q component (quadrature component) of the X polarization, a YI signal of an I component of a Y polarization, and a YQ signal of a Q component of the Y polarization.

A frequency of the local oscillation light r1 is a frequency (carrier frequency) of the input optical signal SO1 to be received, and a frequency of the transmission light r2 is a frequency of the output optical signal SO2 to be transmitted. For example, the local oscillation light r1 and the transmission light r2 have different frequencies, but may have the same frequency. By changing the frequencies of the local oscillation light r1 and the transmission light r2, the wavelength of the optical signal to be turned around can be switched. Namely, the input optical signal SO1 can be converted into the output optical signal SO2 having a different wavelength.

The analog compensation unit 130 is a circuit that performs predetermined analog signal processing on the analog electric signal SA1 between the coherent reception front-end unit 110 and the coherent transmission front-end unit 120 and that thereby generates the analog electric signal SA2. The analog compensation unit 130 performs analog signal processing on the analog electric signal SA1 in such a way as to compensate for signal quality according to a signal characteristic from an input of the coherent reception front-end unit 110 to an output of the coherent transmission front-end unit 120, and generates the analog electric signal SA2.

Note that either or both of the optical signal and the analog electric signal may be simply referred to as a "signal". The compensation of the signal quality in the present example embodiment includes compensation of deterioration of an optical signal that occurs each time the optical relay apparatus passes, and compensation of deterioration of an analog electric signal that occurs in the optical relay apparatus. For example, the deterioration of the optical signal to be compensated includes band deterioration (PBN: Pass Band Narrowing) that occurs when passing through an optical multiplexer/demultiplexer, an optical filter, or the like of each optical relay apparatus, amplitude variation of four lanes caused by variations in O/E or E/O conversion efficiency, optical frequency offset, and the like. Deterioration of the analog electric signal to be compensated includes characteristic deterioration and band deterioration due to characteristic variation of the analog electric circuit of each of the four lanes, amplitude variation of the four lanes, skew of the four lanes, and the like. In other words, the compensation of the signal quality includes band compensation for compensating for the band deterioration of the signal, frequency offset compensation for compensating for deviation of the frequency of the local oscillation light, skew compensation for compensating for variation in timing of each signal component included in the signal, amplitude compensation for compensating for the variation in the amplitude of each signal component included in the signal, and the like.

Figure 8:
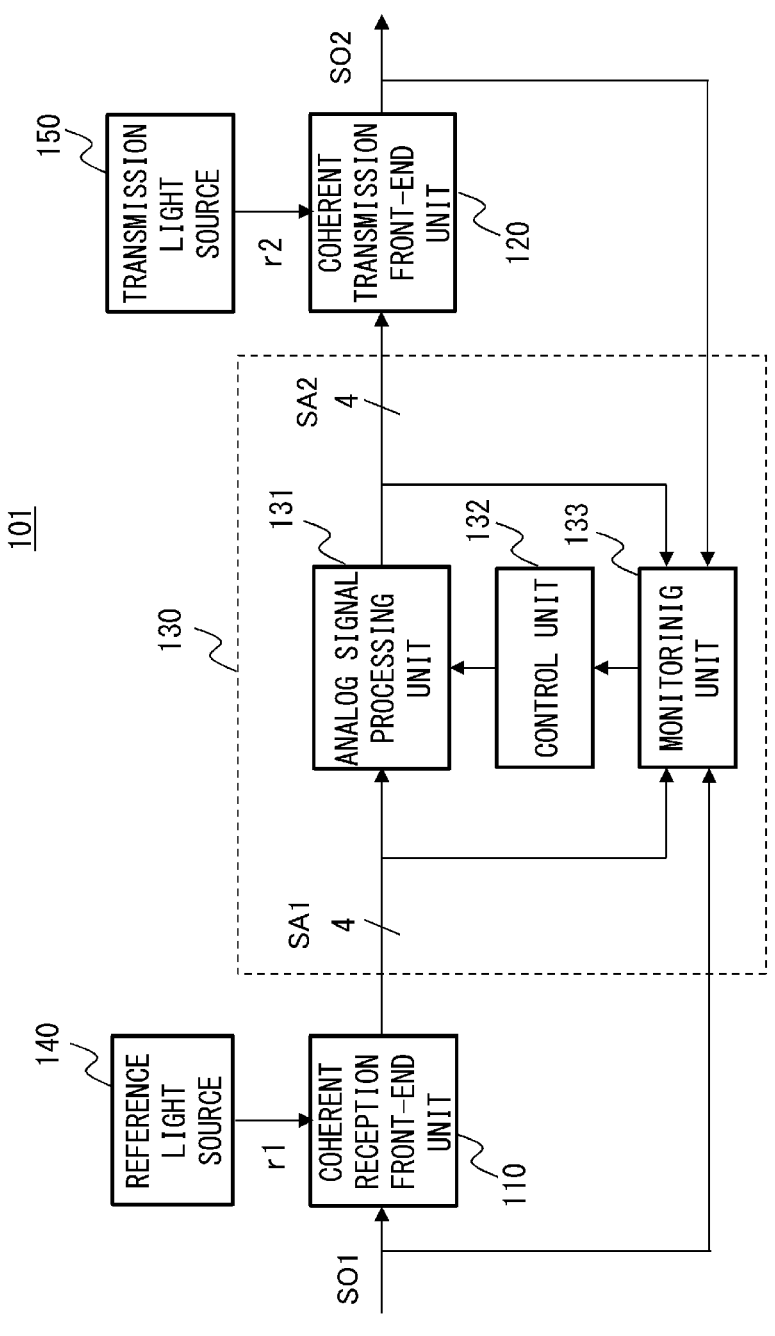
FIG. 8 is a configuration diagram illustrating an example of a configuration of the optical transceiver according to the first example embodiment.

FIG. 8 illustrates a specific example of the optical transceiver 101 according to the present example embodiment. As illustrated in FIG. 8, the analog compensation unit 130 may include an analog signal processing unit 131, a control unit 132, and a monitoring unit 133. Further, the optical transceiver 101 may include a reference light source 140 that generates the local oscillation light r1 and a transmission light source 150 that generates the transmission light r2. The reference light source 140 may be inside the coherent reception front-end unit 110, and the transmission light source 150 may be inside the coherent transmission front-end unit 120.

The analog signal processing unit 131 is an analog circuit that performs predetermined analog signal processing for compensating for signal quality. The analog signal processing unit 131 processes the analog electric signal SA1 as an analog signal and outputs the analog electric signal SA2. The analog signal processing unit 131 performs only analog signal processing, and does not perform digital signal processing in which a large delay occurs. Thus, physical delay can be suppressed to, for example, several nsec or less.

The monitoring unit 133 monitors signal characteristics of any one of the input optical signal SO1, the analog electric signal SA1, the analog electric signal SA2, and the output optical signal SO2 between the input of the coherent reception front-end unit 110 and the output of the coherent transmission front-end unit 120. The signal characteristics to be monitored are, for example, characteristics of a polarization signal (polarization-multiplexed X polarization and Y polarization) included in an optical signal, characteristics of a complex signal (phase-modulated I component and Q component) included in an analog electric signal, and the like.

The control unit 132 controls an operation of the analog signal processing of the analog signal processing unit 131, based on the monitoring result of the monitoring unit 133. By optimizing the analog signal processing according to the monitored signal characteristics, band compensation, skew compensation, and the like are performed, and deterioration in signal quality is suppressed. Since signal processing speeds of the control unit 132 and the monitoring unit 133 do not affect the latency of the main signal, time constants of the control unit 132 and the monitoring unit 133 may be low. The control unit 132 and the monitoring unit 133 may be analog circuits or digital circuits.

Figure 9:
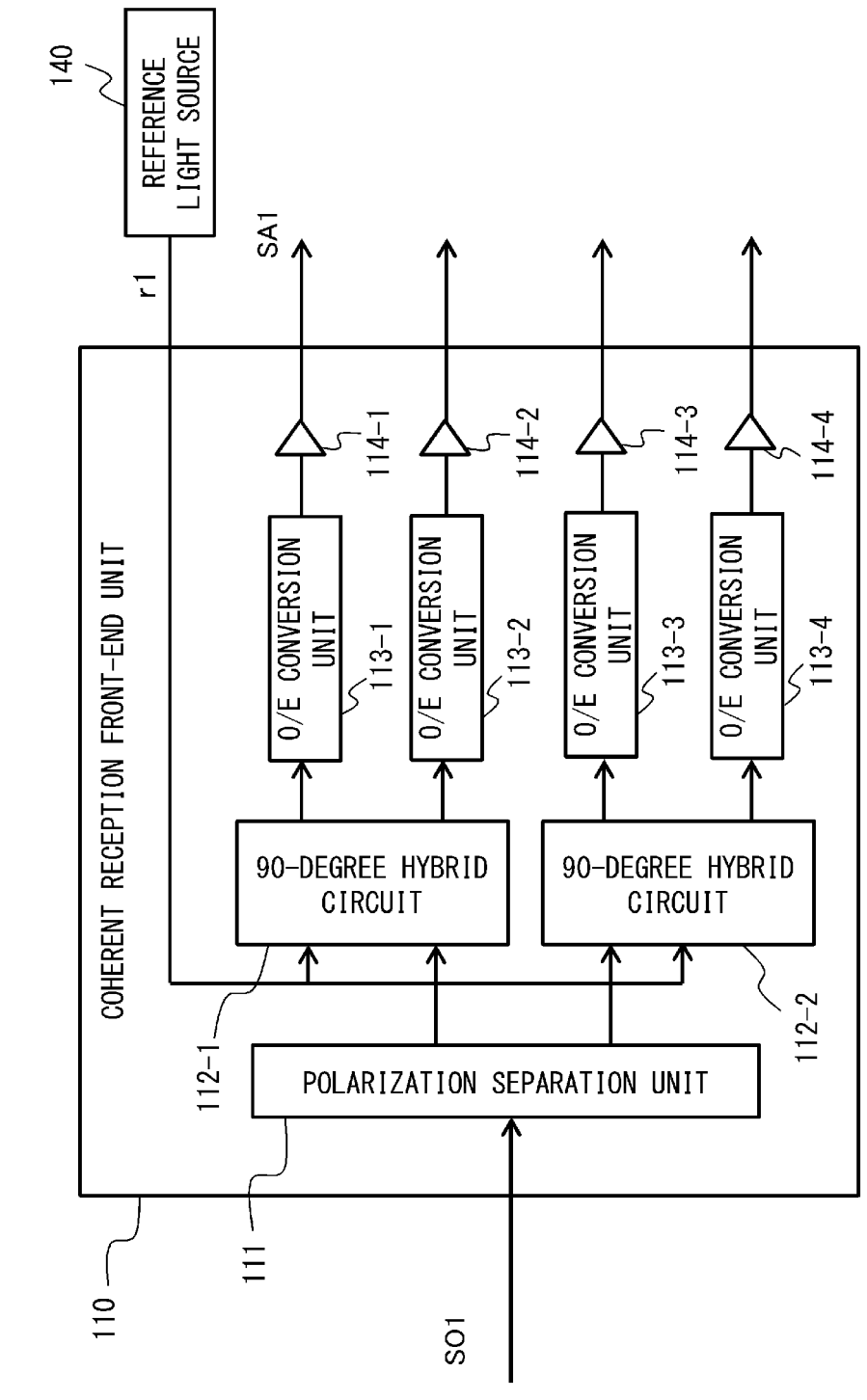
FIG. 9 is a configuration diagram illustrating an example of a configuration of a coherent reception front-end unit according to the first example embodiment.

FIG. 9 illustrates an example of a configuration of the coherent reception front-end unit 110 according to the present example embodiment. As illustrated in FIG. 9, the coherent reception front-end unit 110 includes polarization separation units 111, 90-degree hybrid circuits 112-1 to 112-2, O/E conversion units 113-1 to 113-4, and amplifiers 114-1 to 114-4.

The polarization separation unit 111 polarization-separates the input optical signal SO1, which is the input polarization combined signal, into the X polarization and Y polarization. The 90-degree hybrid circuits (coherent optical detectors) 112-1 to 112-2 perform coherent detection by causing the optical signal polarization-separated by the polarization separation unit 111 and the local oscillation light r1 of the reference light source 140 to interfere with each other, and convert signals detected by the O/E conversion units 113-1 to 113-4 composed of Photo Diode or the like into analog electric signals of four lanes. The 90-degree hybrid circuit 112-1 separates the X polarization of the input optical signal SO1 into an I component and a Q component, and then performs photoelectric conversion by the O/E conversion units 113-1 to 113-2, thereby generating an XI signal and an XQ signal. The 90-degree hybrid circuit 112-2 separates the Y polarization of the input optical signal SO1 into an I component and a Q component, and then performs photoelectric conversion by the O/E conversion units 113-3 to 113-4, thereby generating a YI signal and a YQ signal. The amplifiers 114-1 to 114-4 amplify the generated XI signal, XQ signal, YI signal, and YQ signal, and output the amplified XI signal, XQ signal, YI signal, and YQ signal to the analog compensation unit 130 as analog electric signals SA1 of four lanes. The analog compensation unit 130 performs analog signal processing on all or a part of the XI signal, the XQ signal, the YI signal, and the YQ signal (X polarization or Y polarization).

Figure 10:
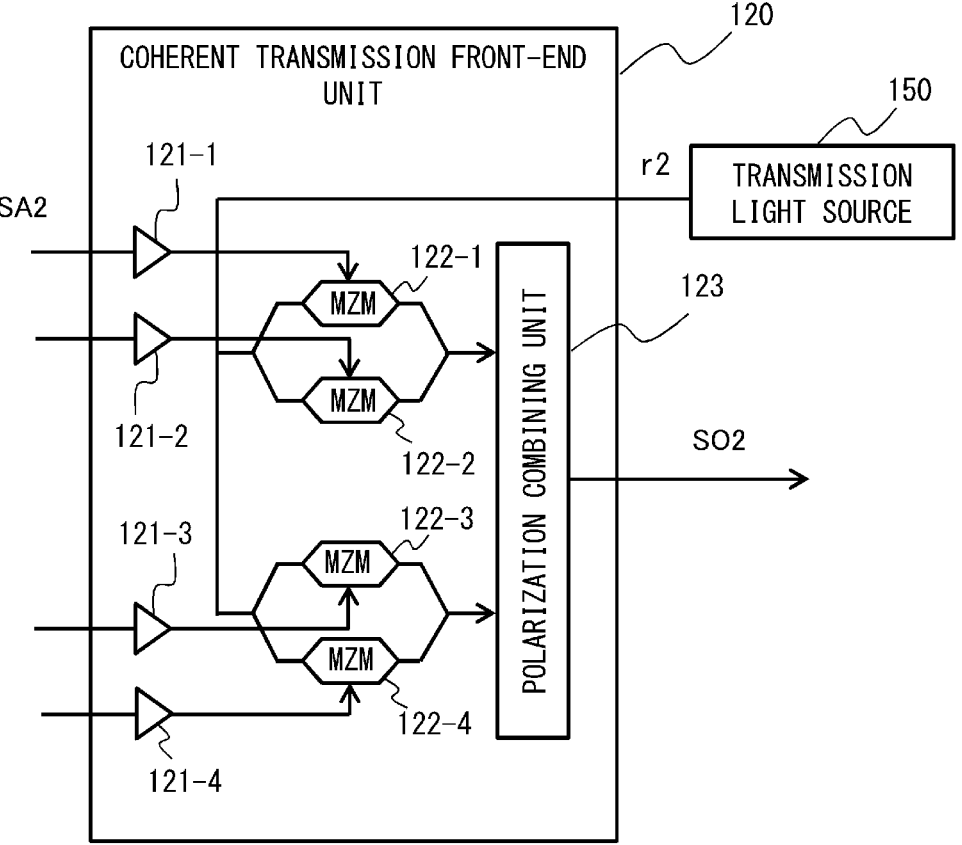
FIG. 10 is a configuration diagram illustrating an example of a configuration of a coherent transmission front-end unit according to the first example embodiment.

FIG. 10 illustrates an example of a configuration of the coherent transmission front-end unit 120 according to the present example embodiment. As illustrated in FIG. 10, the coherent transmission front-end unit 120 includes amplifiers 121-1 to 121-4, MZ modulators (MZM: Mach-Zehnder Modulator) 122-1 to 122-4, and a polarization combining unit 123.

The amplifiers 121-1 to 121-4 amplify the XI signal, the XQ signal, the YI signal, and the YQ signal of the analog electric signal SA2 being output from the analog compensation unit 130, and drive the MZ modulators 122-1 to 122-4. The MZ modulators (IQ optical modulators) 122-1 to 122-4 apply IQ modulation to the transmission light r2 of the transmission light source 150 according to the XI signal, the XQ signal, the YI signal, and the YQ signal to be applied thereto. The MZ modulators 122-1 to 2 generate an IQ modulated optical signal of the X polarization, based on the XI signal and the XQ signal via the amplifiers 121-1 to 121-2. The MZ modulators 122-3 to 4 generate an IQ modulated optical signal of the Y polarization, based on the YI signal and the YQ signal via the amplifiers 121-3 to 121-4. The polarization combining unit 123 performs polarization combining of the generated IQ modulated optical signal of the X polarization and IQ modulated optical signal of the Y polarization, and outputs the combined optical signal as an output optical signal SO2.

As described above, in the optical transmission system, path switching is performed from a transmission end to a reception end as an optical signal, and an optical transparent network in which extra processing is omitted as much as possible is achieved, thereby enabling low delay. However, in a complicated WDM network, a wavelength conflict with other signals makes it impossible to make the shortest path in End-to-End at a single wavelength, and therefore, a path needs to be made while converting the wavelength into an empty wavelength slot. In the related technique, although a channel-based wavelength conversion can be achieved by taking out a signal by ROADM once and reproducing and relaying the signal to another wavelength by a digital coherent optical transceiver, a problem arises in that low latency is impaired due to complicated processing with signal delay such as error correction processing by DSP.

Therefore, in the present example embodiment, the analog signal being output from the coherent optical reception front end is subjected to analog signal processing without through the digital coherent DSP, and is turned around and relayed to the coherent optical transmission front end. Namely, although the optical signal is once converted into an electric signal, only subjected to the necessary minimum analog signal processing, and relayed by converting the optical signal into an optical signal of another wavelength again. Physically, an analog delay of the electric circuit occurs, but it is at most a few nsec or less, which is negligibly small. Therefore, a wavelength conversion function with low latency in units of channels can be achieved. Further, not only the wavelength conversion but also the same wavelength can be relayed at a low latency. Further, in the optical transmission system, in addition to the quality deterioration of the optical signal caused by passing through a plurality of optical relay apparatuses, since the signal quality deteriorates due to imperfections of the electric circuit in the optical relay apparatus, in the present example embodiment, the quality compensation is performed by processing these signal deteriorations as an analog signal. As a result, it is possible to suppress deterioration in signal quality while suppressing delay, and thus it is possible to perform long-distance communication with low latency.

Second Example Embodiment

Hereinafter, a second example embodiment will be explained with reference to the drawings. An optical signal that has passed through each optical relay apparatus in the optical transmission system is subjected to band narrowing due to an influence of an optical filter included in the optical relay apparatus. In particular, the band narrowing occurs in a multi-stage configuration, and therefore, a transmission distance is limited. In addition, in the optical relay apparatus, since the optical signal is once converted into an electric signal, a band of the transceiver is also affected. Therefore, in the present example embodiment, band compensation is enabled in the analog compensation unit of the first example embodiment.

Figure 11:
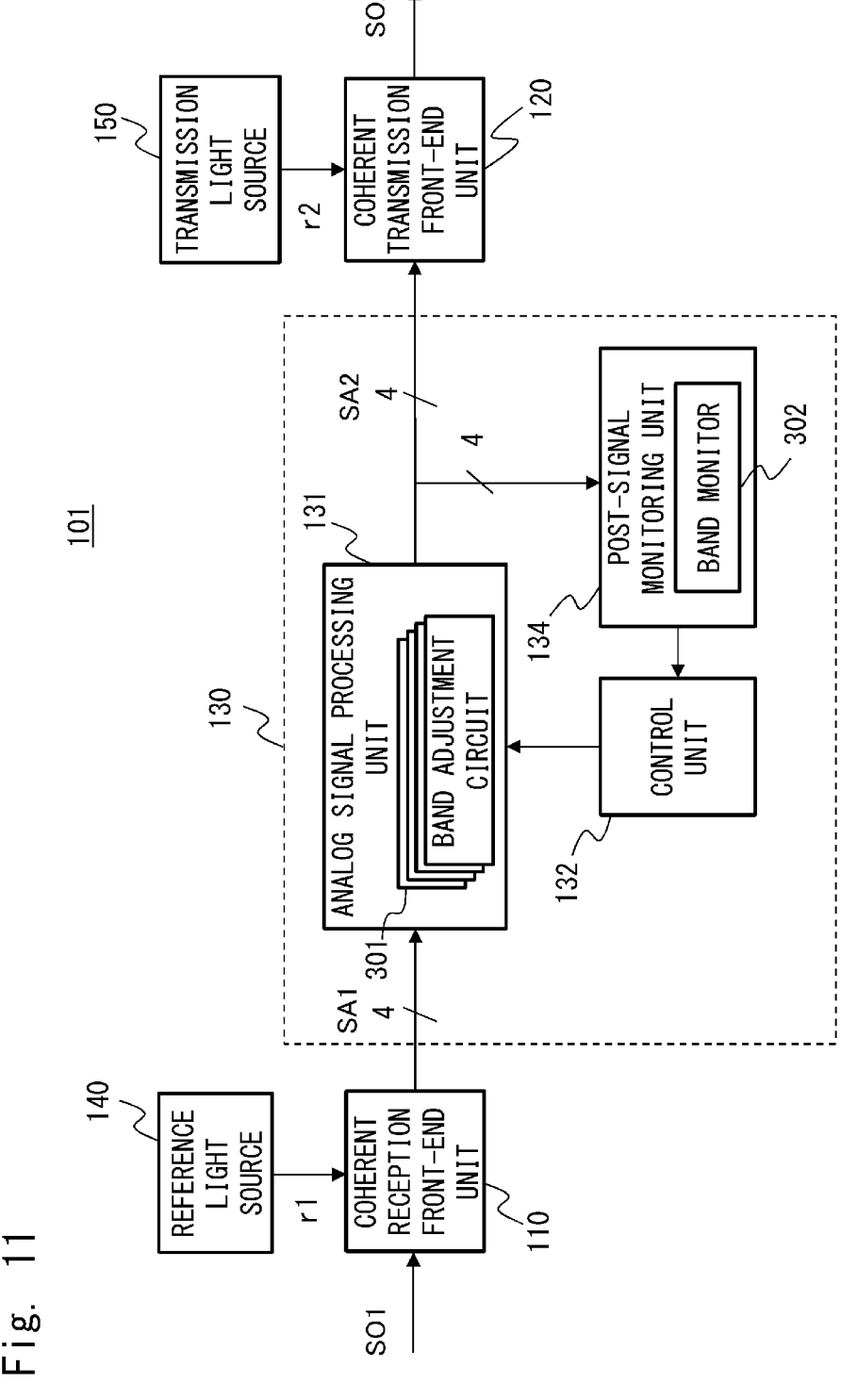
FIG. 11 is a configuration diagram illustrating an example of a configuration of an optical transceiver according to a second example embodiment.

FIG. 11 illustrates an example of a configuration of an optical transceiver 101 according to the present example embodiment. As illustrated in FIG. 11, in the present example embodiment, an analog compensation unit 130 includes an analog signal processing unit 131, a control unit 132, and a post-signal monitoring unit 134.

The analog signal processing unit 131 includes a band adjustment circuit 301 that adjusts a band (frequency component) of an analog electric signal SA1, based on control from the control unit 132. For example, the analog signal processing unit 131 includes four band adjustment circuits 301, and each band adjustment circuit 301 adjusts power of each band of the signal of the four lanes of the analog electric signal SA1. The band adjustment circuit 301 includes, for example, an analog FIR filter, a peaking variable amplifier, an LCR variable filter, and the like, but may be any other analog circuit capable of band adjustment.

The post-signal monitoring unit 134 is an example of the monitoring unit 133 according to the first example embodiment, and monitors an analog electric signal SA2 (post-signal) being output from the analog signal processing unit 131. It can also be said that the post-signal monitoring unit 134 monitors a signal being input to the coherent transmission front-end unit 120. The post-signal monitoring unit 134 includes a band monitor 302 that monitors a band (frequency characteristic) of the analog electric signal SA2. The band monitor 302 monitors a band of a signal of four lanes of the analog electric signal SA2. The bands of four lanes may be monitored by the four band monitors 302, or the bands of four lanes may be monitored by the one band monitor 302 by switching the input signals.

The control unit 132 controls output power for each band of the band adjustment circuit 301, based on the band (frequency characteristic) monitored by the band monitor 302. The control unit 132 controls a bandwidth adjustment amount of the band adjustment circuit 301, which is associated to each signal, according to a monitoring result of the bands of four lanes. For example, as a result of monitoring the analog electric signal SA2, the control unit 132 increases power of the band component that is attenuated more than a desired spectrum.

Figures 12, 13A, 13B:
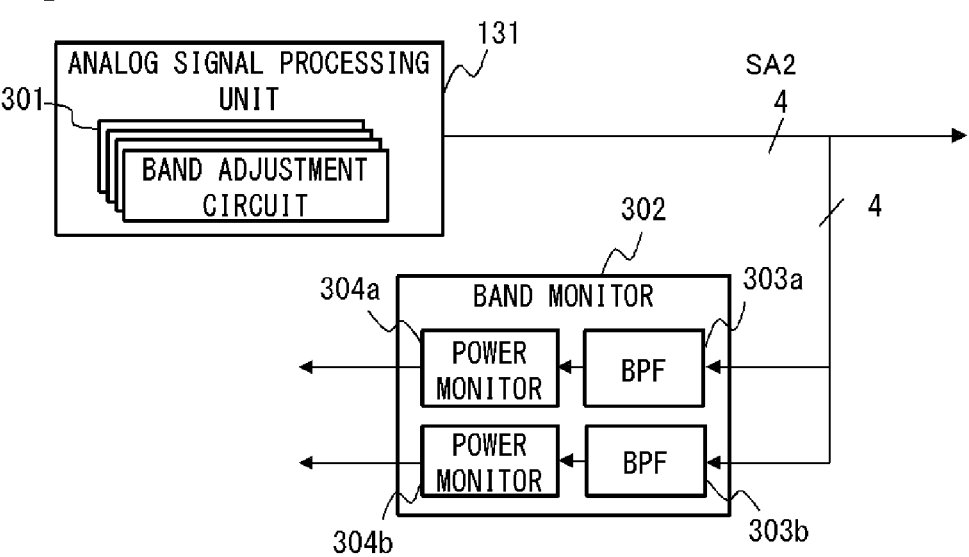
FIG. 12 is a configuration diagram illustrating an example of a configuration of a band monitor according to the second example embodiment.
FIG. 13A is a characteristic diagram illustrating an example of band monitoring according to the second example embodiment.
FIG. 13B is a characteristic diagram illustrating an example of band monitoring according to the second example embodiment.

FIG. 12 illustrates an example of a configuration of the band monitor 302 according to the present example embodiment. As illustrated in FIG. 12, the band monitor 302 includes Band Pass Filters (BPFs) 303a and 303b and power monitors 304a and 304b.

The BPF 303a extracts, for example, a low-frequency component (first band) of the analog electric signal SA2 (any of the four lanes). The power monitor 304a monitors power of the low-frequency component of the analog electric signal SA2 extracted by the BPF 303a. The BPF 303b extracts, for example, a high-frequency component (second band) of the analog electric signal SA2 (any of the four lanes). The power monitor 304b monitors power of the high-frequency component of the analog electric signal SA2 extracted by the BPF 303b.

The control unit 132 controls the band adjustment circuit 301 of each lane according to the monitoring result of the low-frequency component and the high-frequency component of the four lanes of the analog electric signal SA2. For example, as illustrated in FIG. 13A, power of a low frequency f11 and power of a high frequency f12 are monitored, and the output power of the low frequency f11 or the high frequency f12 from the band adjustment circuit 301 is controlled according to a comparison result of these powers. The low frequency f11 and the high frequency f12 are frequencies that have the same power in a state where the signal is not deteriorated (for example, a substantially trapezoidal spectrum). Therefore, a difference $\Delta w1$ between the power of the low frequency f11 and the power of the high frequency f12 is acquired, and the band adjustment amount is controlled in such a way that $\Delta w1$ becomes smaller. As illustrated in FIG. 13B, a band lifting amount of the band adjustment circuit 301 is adjusted in such a way that the power of the low frequency f11 and the power of the high frequency f12 are equal to each other. For example, when the power of the high frequency f12 is lower than the power of the low frequency f11 by $\Delta w1$, the power of the high frequency f12 is controlled to be increased by $\Delta w1$.

Figure 14:
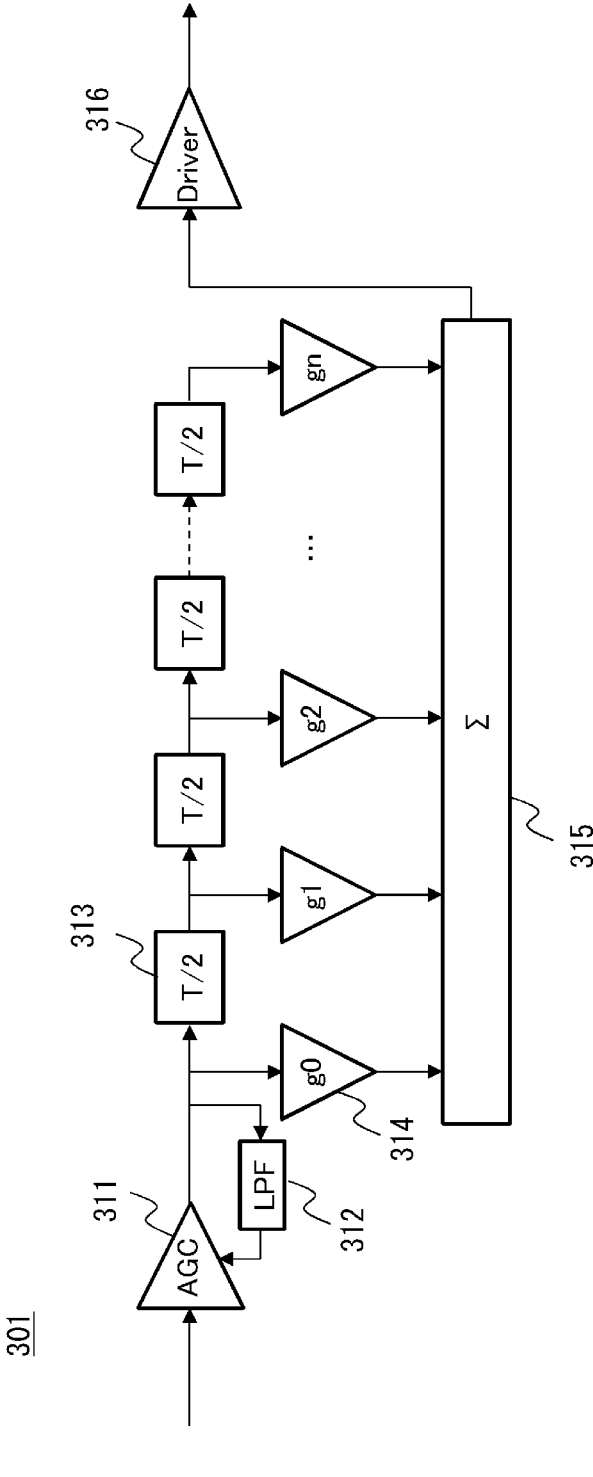
FIG. 14 is a configuration diagram illustrating an example of a configuration of a band adjustment circuit according to the second example embodiment.

FIG. 14 is an example of a configuration of the band adjustment circuit 301 according to the present example embodiment, and illustrates an example in a case where the configuration is constituted by an analog FIR filter. As illustrated in FIG. 14, the band adjustment circuit 301 includes an Automatic Gain Control (AGC) amplifier 311, a Low Pass Filter (LPF) 312, a plurality of delay circuits (T/2) 313, a plurality of weighting circuits (g0 to gn) 314, an adder circuit ($\Sigma$) 315, and a driver circuit (Driver) 316 as an example of the analog FIR filter. Note that the configuration of FIG. 14 is an example, and the analog FIR filter may be configured by other circuits.

The AGC amplifier 311 adjusts a gain via the LPF 312 connected between an output terminal and a control terminal, and amplifies an input signal with the adjusted gain. The amplified signal is gradually delayed in a predetermined time unit by a plurality of delay circuits 313 connected in series. Each of the delayed signals is weighted by the weighting circuit 314, and each of the weighted signals is added by the adder circuit 315. The result of the addition by the adder circuit 315 is output via the driver circuit 316. For example, the control unit 132 controls the power of a predetermined band by adjusting the weighting (coefficient) of the weighting circuit 314 according to the monitoring result of the band monitor 302.

Figure 15:
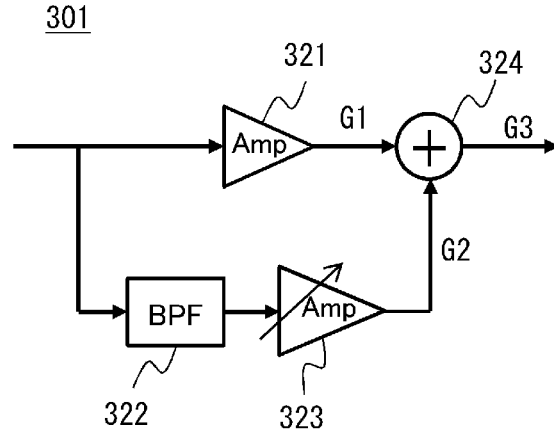
FIG. 15 is a configuration diagram illustrating an example of a configuration of a band adjustment circuit according to the second example embodiment.

FIG. 15 is an example of another configuration of the band adjustment circuit 301 according to the present example embodiment, and illustrates an example in a case where the configuration is constituted by a peaking variable amplifier. As illustrated in FIG. 15, the band adjustment circuit 301 includes an amplifier 321, a BPF 322, a variable gain amplifier 323, and an adder circuit 324 as an example of the peaking variable amplifier. Note that the configuration of FIG. 15 is an example, and the peaking variable amplifier may be configured by other circuits. The amplifier 321 amplifies the input signal and outputs an amplified signal G1 to the adder circuit 324. The BPF 322 extracts a predetermined band component (for example, a high-frequency component) of the input signal. The variable gain amplifier 323 amplifies the signal in the extracted band and outputs an amplified signal G2 to the adder circuit 324. The adder circuit 324 adds the signal G1 from the amplifier 321 and the signal G2 from the variable gain amplifier 323, and outputs an added signal G3.

Figure 16:
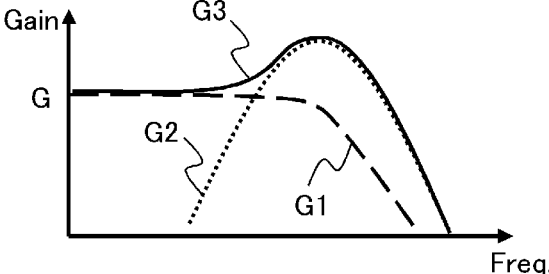
FIG. 16 is a characteristic diagram illustrating an example of characteristics of the band adjustment circuit according to the second example embodiment.

FIG. 16 illustrates characteristics of each signal in the band adjustment circuit 301 of FIG. 15. The high-frequency component of the signal G1 acquired by amplifying the input signal by the amplifier 321 is attenuated. When the BPF 322 extracts the high-frequency component of the input signal, the signal G2 amplified by the variable gain amplifier 323 becomes a signal in which the gain is lifted only by the high-frequency component. Then, the signal G3 acquired by adding the signal G1 and the signal G2 by the adder circuit 324 has a characteristic acquired by lifting the high-frequency component from the signal G1. For example, the control unit 132 controls the power of a predetermined band by adjusting a pass band of the BPF 322 and the gain of the variable gain amplifier 323 according to the monitoring result of the band monitor 302.

Figure 17:
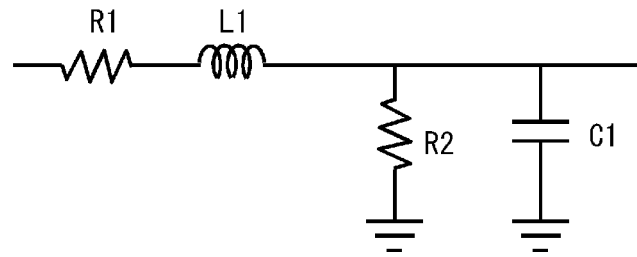
FIG. 17 is a configuration diagram illustrating an example of a configuration of the band adjustment circuit according to the second example embodiment.

FIG. 17 is an example of another configuration of the band adjustment circuit 301 according to the present example embodiment, and illustrates an example in a case where the configuration is constituted by an LCR variable filter. As illustrated in FIG. 17, the band adjustment circuit 301 includes, as an example of the LCR variable filter, a resistor R1, an inductor L1, a resistor R2, and a capacity C1. Note that the configuration of FIG. 17 is an example, and the LCR variable filter may be configured by other circuits. The resistor R1 and the inductor L1 are connected in series between an input terminal and an output terminal, and the resistor R2 and the capacity C1 are connected in parallel between the output terminal and a ground terminal. For example, the resistors R1 and R2 are variable resistors, the capacity C1 is a variable capacity, and the inductor L1 is a variable inductor, and the control unit 132 controls power of a predetermined band by adjusting these variable resistors, variable capacity, and variable inductor.

As described above, in the present example embodiment, a spectrum of the post-signal (analog electric signal SA2) of the analog signal processing unit is monitored, and the band component is adjusted by the analog signal processing unit according to the monitoring result, whereby the band compensation is performed by the analog signal processing. As a result, an optical signal that has been appropriately band-compensated by the analog signal processing unit can be transmitted, and 2R (Receive/Reshape) relay can be performed. Therefore, the signal quality at the final receiving end can be improved and the transmission distance can be increased.

Third Example Embodiment

Hereinafter, a third example embodiment will be explained with reference to the drawings. Although the band compensation has been performed in the second example embodiment, when there is a frequency offset in local oscillation light of a reference light source, it affects frequency characteristics of an analog electric signal coherently detected by the local oscillation light, and thus, it is difficult to monitor and compensate for a correct band. Therefore, in the present example embodiment, the analog compensation unit of the second example embodiment performs frequency offset compensation and band compensation. Note that only the frequency offset may be compensated without performing the band compensation.

Figure 18:
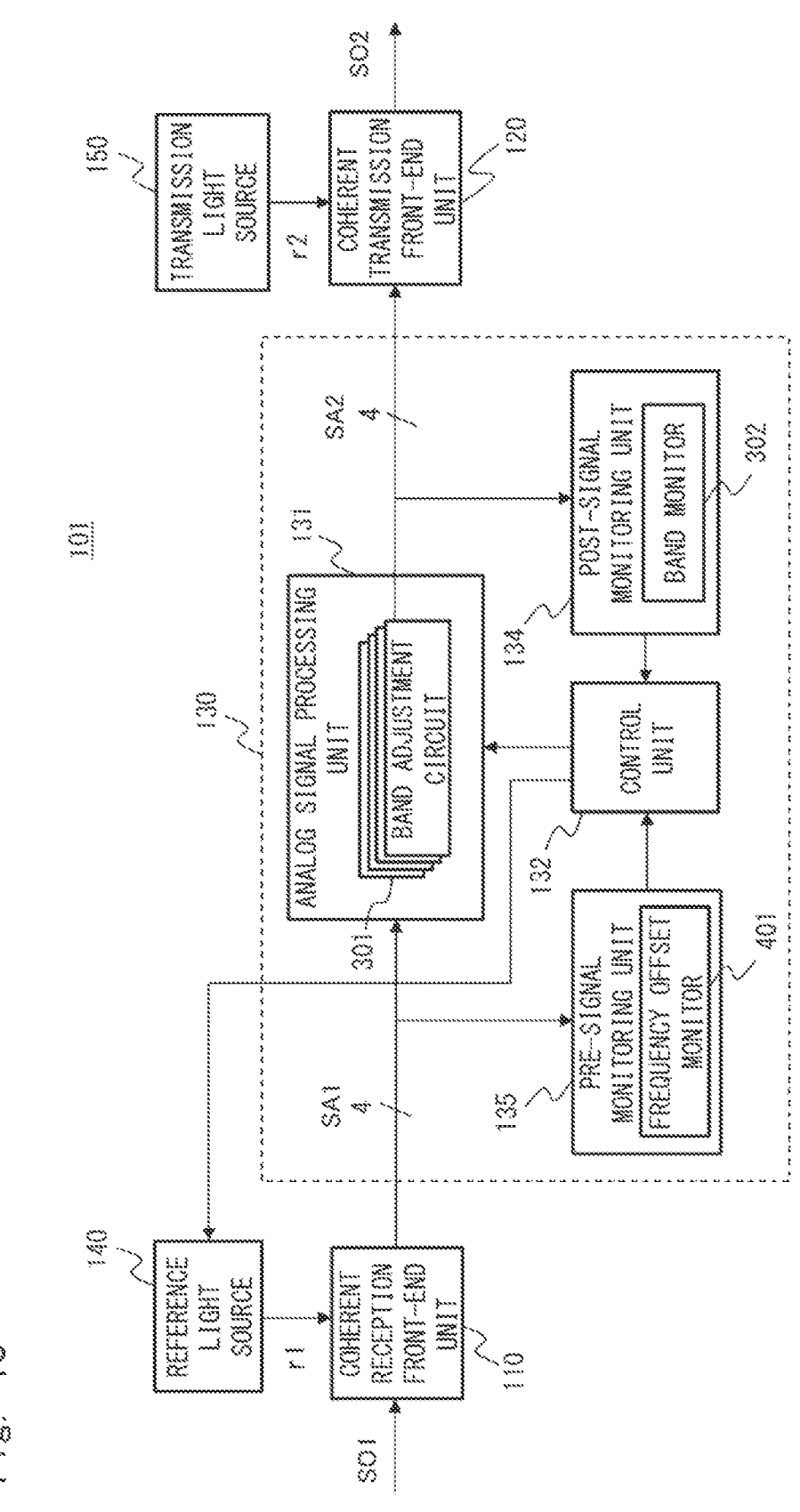
FIG. 18 is a configuration diagram illustrating an example of a configuration of an optical transceiver according to a third example embodiment.

FIG. 18 illustrates an example of a configuration of an optical transceiver 101 according to the present example embodiment. As illustrated in FIG. 18, in the present example embodiment, an analog compensation unit 130 includes a pre-signal monitoring unit 135, in addition to the configuration of the second example embodiment. Other configurations are the same as those of the second example embodiment.

The pre-signal monitoring unit 135 is an example of the monitoring unit 133, and monitors the analog electric signal SA1 (pre-signal) being input to the analog signal processing unit 131. It can also be said that the pre-signal monitoring unit 135 monitors a signal being output from the coherent reception front-end unit 110. The pre-signal monitoring unit 135 includes a frequency offset monitor 401 that monitors a frequency offset of local oscillation light r1 by the analog electric signal SA1. The frequency offset monitor 401 may monitor the frequency offset by a signal of four lanes of the analog electric signal SA1, or may monitor the frequency offset by a signal of two lanes (an X polarization or a Y polarization).

The control unit 132 controls a frequency of the local oscillation light r1 of a reference light source 140, based on the frequency offset monitored by the frequency offset monitor 401. The control unit 132 controls a shift amount of an output frequency of the reference light source 140 according to the monitoring result of the frequency offset of four lanes or two lanes. For example, the control unit 132 shifts the frequency of the local oscillation light r1 in such a way as to correct a deviation from a desired spectrum as a result of monitoring the analog electric signal SA1.

Figure 19:
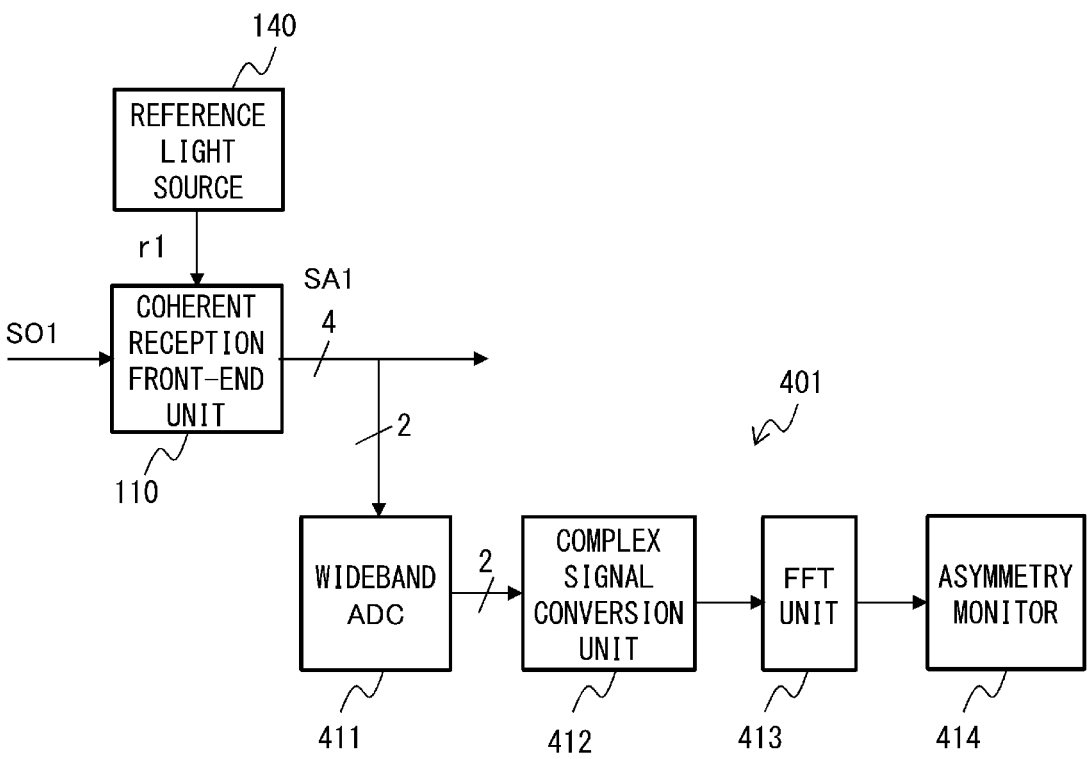
FIG. 19 is a configuration diagram illustrating an example of a configuration of a frequency offset monitor according to the third example embodiment.

FIG. 19 illustrates an example of a configuration of the frequency offset monitor 401 according to the present example embodiment. In the example of FIG. 19, the analog electric signal SA1 is captured by a full-band Analog/Digital Converter (ADC) and the spectrum is thereby recovered. In this example, a wideband ADC or the like is required, which is expensive, but it is possible to monitor the main signal while conducting.

As illustrated in FIG. 19, the frequency-offset monitor 401 includes a wideband ADC 411, a complex signal conversion unit 412, a Fast Fourier Transform (FFT) unit 413, and an asymmetry monitor 414. The wideband ADC 411 converts the full band of the analog electric signal SA1 into a digital signal. The wideband ADC 411 performs AD conversion on two lanes (an XI signal and an XQ signal, or a YI signal and a YQ signal) of one of the four lanes of the X polarization and the Y polarization of the analog electric signal SA1. The complex signal conversion unit (complex signal generation unit) 412 converts the digital I and Q signals subjected to AD conversion into complex signals (I+jQ). The FFT unit (FFT processing unit) 413 performs FFT processing on the converted complex signal and generates a spectrum in the frequency domain. Thus, a spectrum of an input optical signal SO1 is acquired. The asymmetry monitor 414 monitors bilateral asymmetry with respect to a center frequency of the spectrum of the input optical signal SO1 acquired by the FFT processing. The asymmetry monitor 414 may monitor the asymmetry, based on a spectrum acquired by integrating and averaging results of the FFT processing.

Figure 20A:
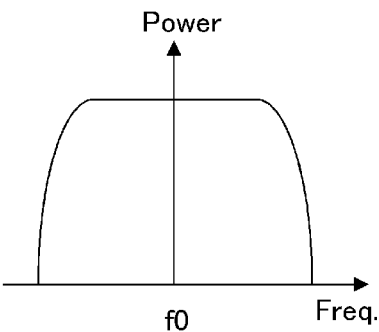
FIG. 20A is a characteristic diagram illustrating an example of monitoring a frequency offset according to the third example embodiment.
Figure 20B:
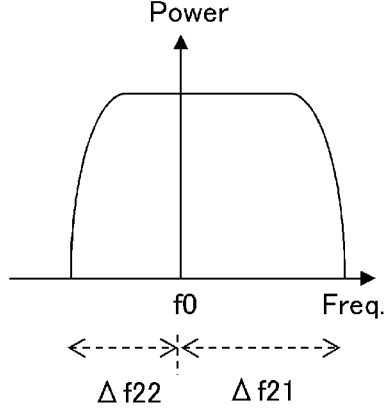
FIG. 20B is a characteristic diagram illustrating an example of monitoring the frequency offset according to the third example embodiment.

FIGS. 20A and 20B are monitor results by the frequency offset monitor 401 in FIG. 19, and illustrate examples of spectra without a frequency offset and with a frequency offset, respectively. As illustrated in FIG. 20A, when there is no frequency offset, the spectrum of the input optical signal SO1 is bilaterally symmetrical with respect to a center frequency f0. As illustrated in FIG. 20B, when there is a frequency offset, the spectrum of the input optical signal SO1 is bilaterally asymmetric with respect to the center frequency f0. The control unit 132 controls a shift amount of the local oscillation light r1 in such a way that the spectrum of the input optical signal SO1 is bilaterally symmetrical with respect to the center frequency f0. For example, when Δf21 from f0 to a positive end of the spectrum is different from Δf22 from f0 to a negative end of the spectrum, a frequency of the local oscillation light r1 is shifted in such a way that Δf21 and Δf22 are equal to each other. The shift amount of the frequency of the local oscillation light r1 is controlled according to a difference between Δf21 and Δf22.

Figure 21:
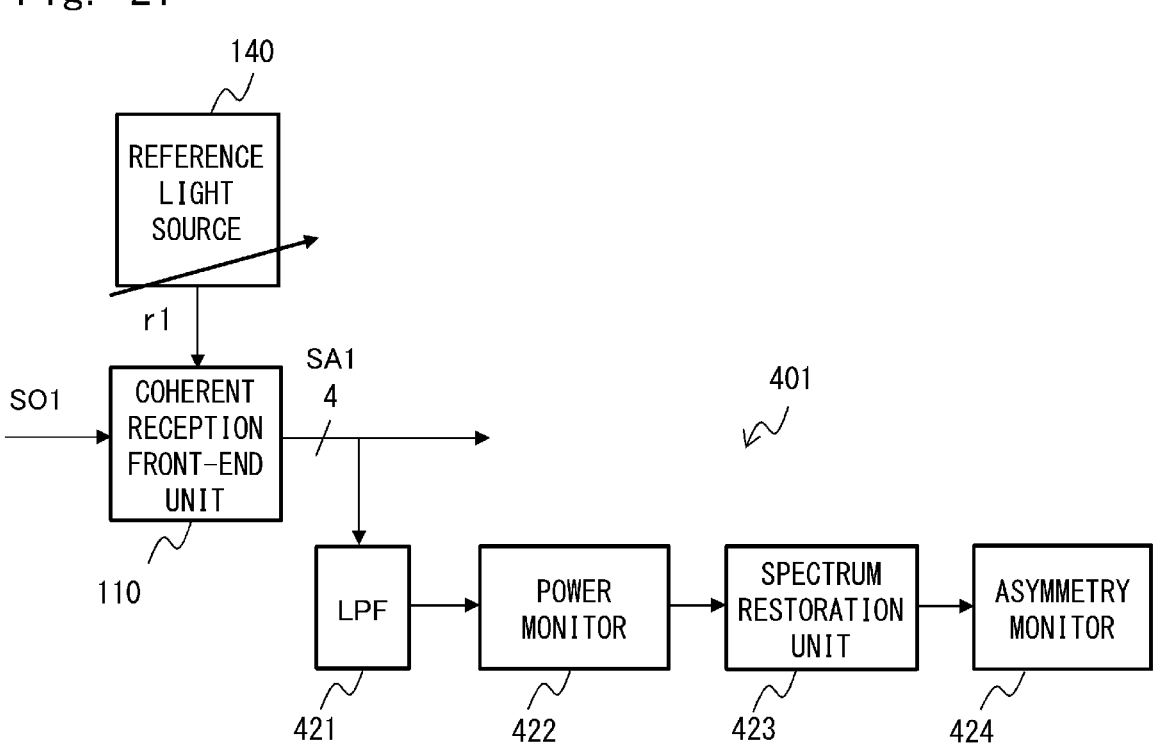
FIG. 21 is a configuration diagram illustrating an example of a configuration of the frequency offset monitor according to the third example embodiment.

FIG. 21 illustrates an example of another configuration of the frequency offset monitor 401 according to the present example embodiment. In the example of FIG. 21, power of the analog electric signal SA1 is monitored while sweeping the frequency of the local oscillation light r1, which is a reference light source, thereby restoring the spectrum. In this example, since the local oscillation light is monitored while being controlled, it is not possible to monitor the main signal while conducting, but it can be achieved at low cost. Note that a monitor light source correlated with the local oscillation light may be prepared, and the frequency offset may be monitored by the monitor light source.

As illustrated in FIG. 21, the frequency offset monitor 401 includes an LPF 421, a power monitor 422, a spectrum restoration unit 423, and an asymmetry monitor 424. For example, although the monitoring is performed before the optical signal is conducted, the monitoring may be performed at an arbitrary timing at which the optical signal is not transmitted and received. When monitoring is performed, the frequency of the local oscillation light r1 of the reference light source 140 is swept. Namely, the frequency of the local oscillation light r1 is gradually increased from the lowest frequency to the highest frequency in a range of the spectrum to be generated. The power monitor 422 monitors, via the LPF 421, the power of the analog electric signal SA1 generated by mixing the local oscillation light r1 having a variable frequency with the input optical signal SO1. Namely, the analog electric signal SA1 is a signal acquired by cutting out the input optical signal SO1 in a band of the LPF 421 centered on the frequency of the local oscillation light r1. In other words, by variably mixing the frequency of the local oscillation light r1, which is the reference light, with respect to the input optical signal SO1 and extracting the signal via the LPF 421, it is possible to perform a role equivalent to the variable optical bandpass filter. Therefore, the power monitor 422 can monitor the power of each band of the input optical signal SO1 by varying the local oscillation light r1. The signals of four lanes of the analog electric signal SA1 may be monitored, or the signals of any lanes may be monitored. The spectrum restoration unit (spectrum generation unit) 423 plots the power of each band of the input optical signal SO1 from a power monitor value of the analog electric signal SA1 monitored while sweeping the local oscillation light r1, and restores (generates) the spectrum. The asymmetry monitor 424 monitors asymmetry of the restored spectrum, similar to FIG. 19.

For example, in the configuration of FIG. 21, the frequency offset monitor 401 may monitor the entire spectrum or may monitor only some frequency components. The frequency offset monitor 401 may monitor the spectrum asymmetry by power of a first band and power of a second band in the input optical signal SO1, and the control unit 132 may control the frequency of the local oscillation light r1 in such a way that the power of the first band and the power of the second band are equal to each other.

Figure 22A:
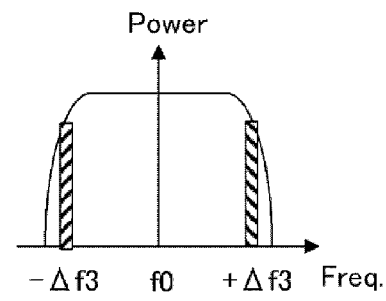
FIG. 22A is a characteristic diagram illustrating an example of monitoring the frequency offset according to the third example embodiment.
Figure 22B:
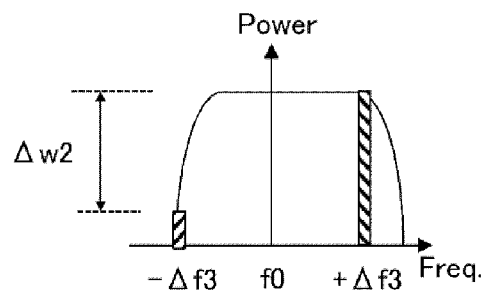
FIG. 22B is a characteristic diagram illustrating an example of monitoring the frequency offset according to the third example embodiment.

For example, as illustrated in FIGS. 22A and 22B, the frequency of the local oscillation light r1 is varied to −Δf3 and +Δf3, and frequency components of −Δf3 and +Δf3 are monitored. As illustrated in FIG. 22A, in a case where there is no frequency offset, since the spectrum of the input optical signal SO1 is bilaterally symmetrical, power of −Δf3 and power of +Δf3 become equal to each other. −Δf3 and +Δf3 are frequencies in the vicinity of both ends in the frequency axis direction in the spectrum in the case where there is no frequency offset, and are frequencies in the vicinity of an attenuation point at which the power starts to attenuate from the maximum level. In other words, in a substantially trapezoidal spectrum, −Δf3 and +Δf3 are frequencies in the vicinity of both ends of the upper base (upper side).

As illustrated in FIG. 22B, when there is a frequency offset, the spectrum of the input optical signal SO1 becomes bilaterally asymmetric, and a difference Δw2 is generated between the power of −Δf3 and the power of +Δf3. Therefore, the frequency of the local oscillation light r1 is controlled in such a way that Δw2 becomes smaller and the power of −Δf3 and the power of +Δf3 become equal to each other. For example, when the power of −Δf3 is lower by Δw2 than the power of +Δf3, the frequency of the local oscillation light r1 is gradually lowered, and the frequency of the local oscillation light r1 is shifted until the power of Δf3 and the power of +Δf3 become equal.

As described above, in the present example embodiment, in addition to the band compensation of the second example embodiment, the frequency offset is compensated by controlling the frequency of the local oscillation light of the reference light source according to the frequency offset amount of the local oscillation light r1 estimated from the pre-signal (analog electric signal SA1) of the analog signal processing unit. Thus, it is possible to appropriately perform band compensation according to the second example embodiment after suppressing the frequency offset of the local oscillation light. Therefore, signal quality can be further improved and a transmission distance can be increased without being affected by the frequency offset of the reference light source.

Modified Example of Third Example Embodiment

Figure 23:
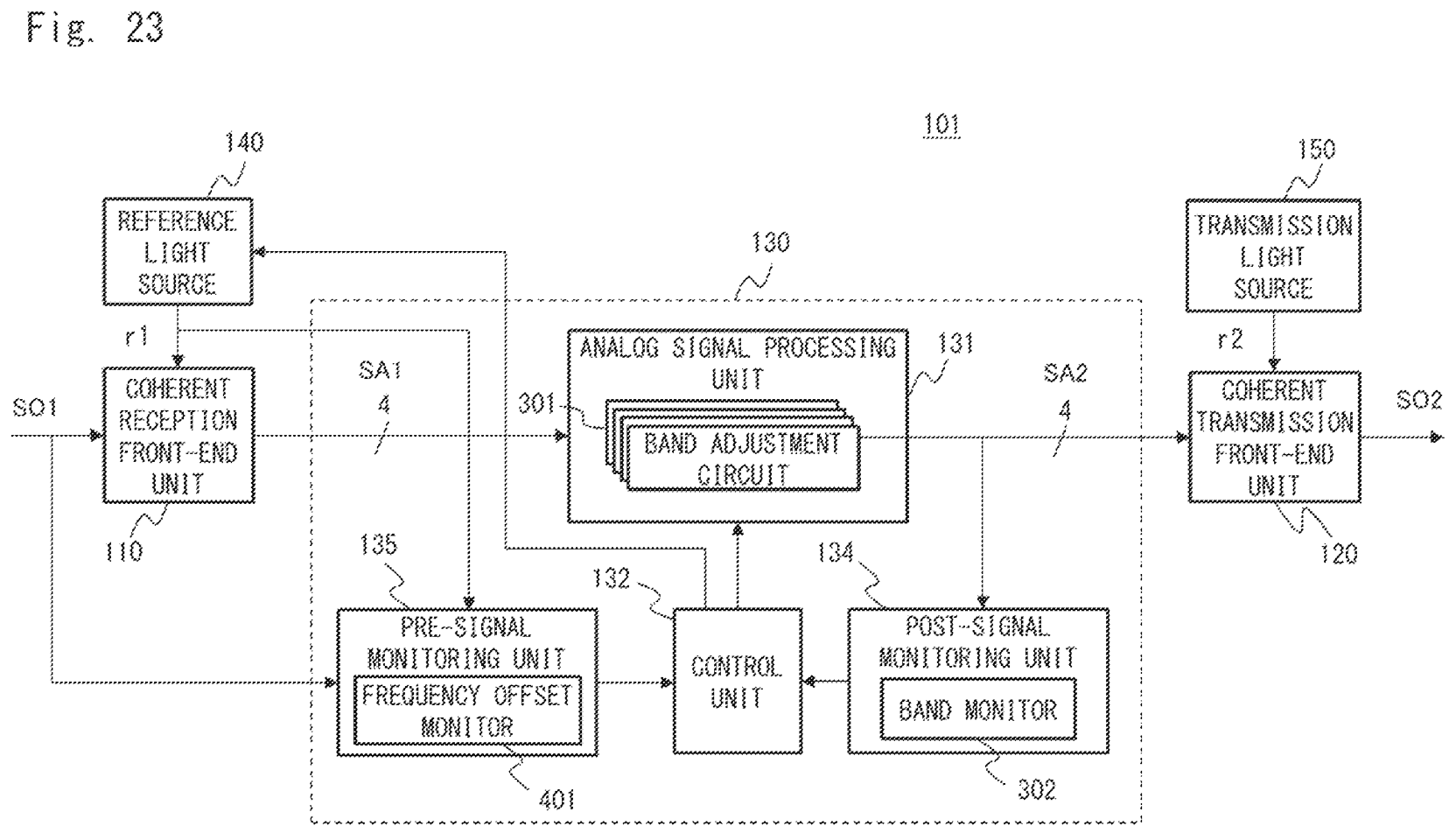

FIG. 23 illustrates a configuration of a modified example of the third example embodiment. In the third example embodiment, the analog electric signal SA1 between the coherent reception front-end unit 110 and the analog signal processing unit 131 is monitored, but as illustrated in FIG. 23, the input optical signal SO1, which is an input of the coherent reception front-end unit 110, may be branched and monitored. For example, the frequency offset monitor 401 monitors the frequency offset by the input optical signal SO1 and the local oscillation light r1. Namely, the frequency offset of the local oscillation light r1 is monitored based on the spectrum of the input optical signal SO1 and the spectrum of the local oscillation light r1.

Figure 24:
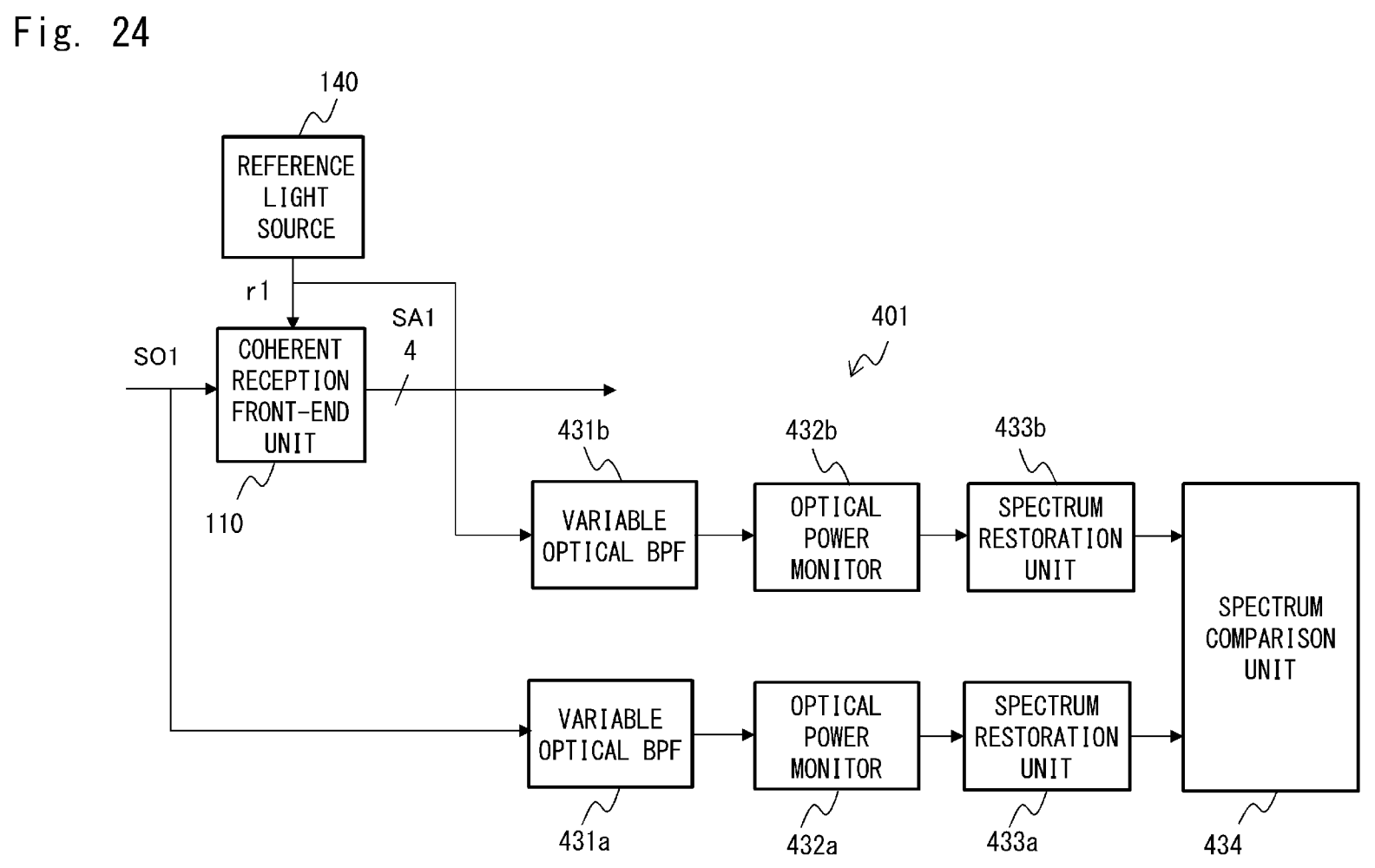

FIG. 24 illustrates an example of a configuration of a frequency offset monitor 401 according to a modified example of the third example embodiment. In this example, spectrums of both the input optical signal SO1 and the local oscillation light r1 are restored by a variable optical BPF and an optical power monitor, and deviation of the frequency is monitored.

As illustrated in FIG. 24, the frequency offset monitor 401 includes variable optical BPFs 431a and 431b, optical power monitors 432a and 432b, spectrum restoration units 433a and 433b, and a spectrum comparison unit 434.

The variable optical BPF 431a, the optical power monitor 432a, and the spectrum restoration unit 433a monitor the spectrum of the input optical signal SO1. The variable optical BPF 431b, the optical power monitor 432b, and the spectrum restoration unit 433b monitor the spectrum of the local oscillation light r1. The spectrums of the input optical signal SO1 and the local oscillation light r1 may be monitored by switching the signals to be input, by one variable optical BPF, one optical power monitor, and one spectrum restoration unit.

The variable optical BPF (input optical BPF) 431a extracts each frequency component of the input optical signal SO1 (which may be an X polarization or a Y polarization) by varying the center frequency of a pass band. The optical power monitor (input optical power monitor unit) 432a monitors the power of each frequency (band) of the extracted input optical signal 501. The spectrum restoration unit (input optical spectrum generation unit) 433a restores the spectrum, based on the power of each frequency of the monitored input optical signal 501. Similarly, the variable optical BPF (local oscillation light BPF) 431b extracts each frequency component of the local oscillation light r1 by varying the center frequency of the pass band. The optical power monitor (local oscillation light power monitoring unit) 432b monitors the power of each frequency (band) of the extracted local oscillation light r1. The spectrum restoration unit (local oscillation light spectrum generation unit) 433b restores the spectrum by the power of each frequency of the monitored local oscillation light r1. The spectrum comparison unit 434 compares the spectrum of the restored input optical signal SO1 with the spectrum of local oscillation light r1, and monitors the frequency offset, based on the comparison result.

Figure 25:
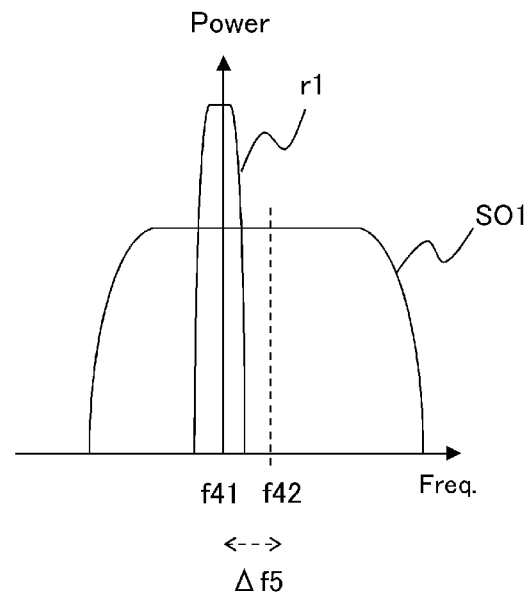
FIG. 25 is a characteristic diagram illustrating an example of monitoring a frequency offset according to the modified example of the third example embodiment.

FIG. 25 illustrates an example of a monitoring result by the frequency offset monitor 401 of FIG. 24. When there is a frequency offset, a center frequency f41 of the spectrum of the local oscillation light r1 deviates from a center frequency f42 of the spectrum of the input optical signal SO1. Therefore, a difference $\Delta f5$ between the center frequency f42 of the spectrum of the input optical signal SO1 and the center frequency f41 of the spectrum of the local oscillation light r1 is acquired, and the frequency of the local oscillation light r1 is shifted in such a way that $\Delta f5$ becomes small. Due to the principle of the present spectrum monitor, it is impossible to monitor the spectrum with a resolution less than or equal to a bandwidth of the variable optical BPF, and therefore, the spectrum monitoring result of the local oscillation light r1 can be monitored with sufficient accuracy for the purpose of monitoring the center frequency even though the spectrum spreads more than the spectrum of the original single frequency (single wavelength).

In this example, it is not necessary to sweep the local oscillation light r1 serving as the reference light source, and the branched input optical signal SO1 and local oscillation light r1 can be controlled even during signal conduction because the center frequency of the variable optical BPF can be varied, thereby enabling to monitor each of the spectra.

Fourth Example Embodiment

Hereinafter, a fourth example embodiment will be explained with reference to the drawings. Ideally, a signal whose skew and amplitude of four lanes (XI, XQ, YI, and YQ) are compensated at a transmitting end reaches a receiving end. However, when an optical signal is once converted into an analog electric signal in an optical transceiver, when there is a skew or an amplitude error between the four lanes, signal quality deteriorates and a transmission distance may be limited. Therefore, in the present example embodiment, amplitude compensation and skew compensation are performed in the analog compensation units of the first to third example embodiments. Note that only one of the amplitude compensation and the skew compensation may be performed.

Figure 26:
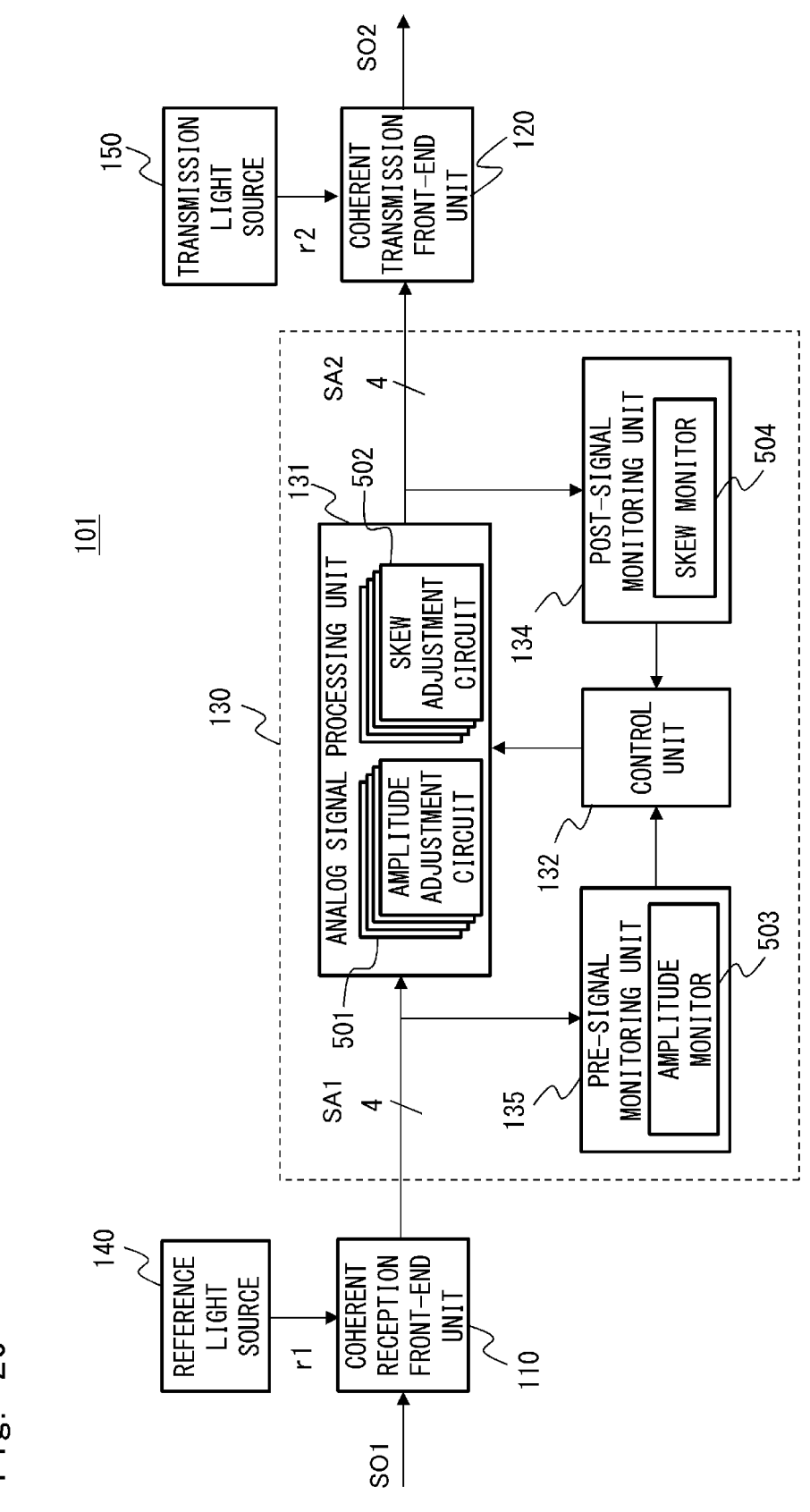
FIG. 26 is a configuration diagram illustrating an example of a configuration of an optical transceiver according to a fourth example embodiment.

FIG. 26 illustrates an example of a configuration of an optical transceiver 101 according to the present example embodiment. As illustrated in FIG. 26, in the present example embodiment, an analog compensation unit 130 includes an analog signal processing unit 131, a control unit 132, a pre-signal monitoring unit 135, and a post-signal monitoring unit 134.

The analog signal processing unit 131 includes an amplitude adjustment circuit 501 that adjusts amplitude of an analog electric signal SA1, based on control from the control unit 132, and a skew adjustment circuit 502 that adjusts skew of the analog electric signal SA1, based on the control from the control unit 132. For example, the analog signal processing unit 131 includes four amplitude adjustment circuits 501 and four skew adjustment circuits 502. Each amplitude adjustment circuit 501 adjusts the amplitude of the signal of four lanes of the analog electric signal SA1, and each skew adjustment circuit 502 adjusts the skew of the signal of the four lanes of the analog electric signal SA1. In this example, the skew adjustment circuit 502 adjusts the skew with respect to the signal whose amplitude is adjusted by the amplitude adjustment circuit 501. The amplitude adjustment circuit 501 is, for example, an amplifier or the like, but may be any other analog circuit capable of adjusting the amplitude. The skew adjustment circuit 502 is, for example, a delay adjustment device, a phase shifter (phase adjuster), or the like, but may be any other analog circuit capable of skew adjustment.

The pre-signal monitoring unit 135 includes an amplitude monitor 503 that monitors the amplitude of the analog electric signal SA1. The amplitude monitor 503 monitors the amplitude of the signal of the four lanes of the analog electric signal SA1. The amplitude of the four lanes may be monitored by the four amplitude monitors 503, or the amplitude of the four lanes may be monitored by switching signals to be input, by one amplitude monitor 503. For example, the amplitude monitor 503 includes a power monitor or the like.

The control unit 132 controls output amplitude (power) of the amplitude adjustment circuit 501, based on the amplitude monitored by the amplitude monitor 503. The control unit 132 controls an amplitude adjustment amount of the amplitude adjustment circuit 501 associated to each signal according to the monitoring result of the amplitude of the four lanes. For example, as a result of monitoring the four lanes of the analog electric signal SA1, the control unit 132 increases the amplitude of the attenuating lane and equalizes the amplitudes of the lanes.

The post-signal monitoring unit 134 includes a skew monitor 504 that monitors the skew of the analog electric signal SA2. The skew monitor 504 may monitor skew of a signal of four lanes of the analog electric signal SA2, or may monitor skew of a signal of two lanes (an X polarization or a Y polarization). At least skew of I and Q components of the X polarization or Y polarization included in the analog electric signal SA2 is monitored.

The control unit 132 controls a skew adjustment amount of the skew adjustment circuit 502, based on the skew monitored by the skew monitor 504. The control unit 132 controls a delay of the I component and the Q component in the skew adjustment circuit 502 according to the result of monitoring the skew of the I component and the Q component (four lanes or two lanes). For example, as a result of monitoring the I and Q components of the analog electric signal SA2, the control unit 132 advances a phase of the delayed lane and matches phases (timings) of the lanes.

Figure 27:
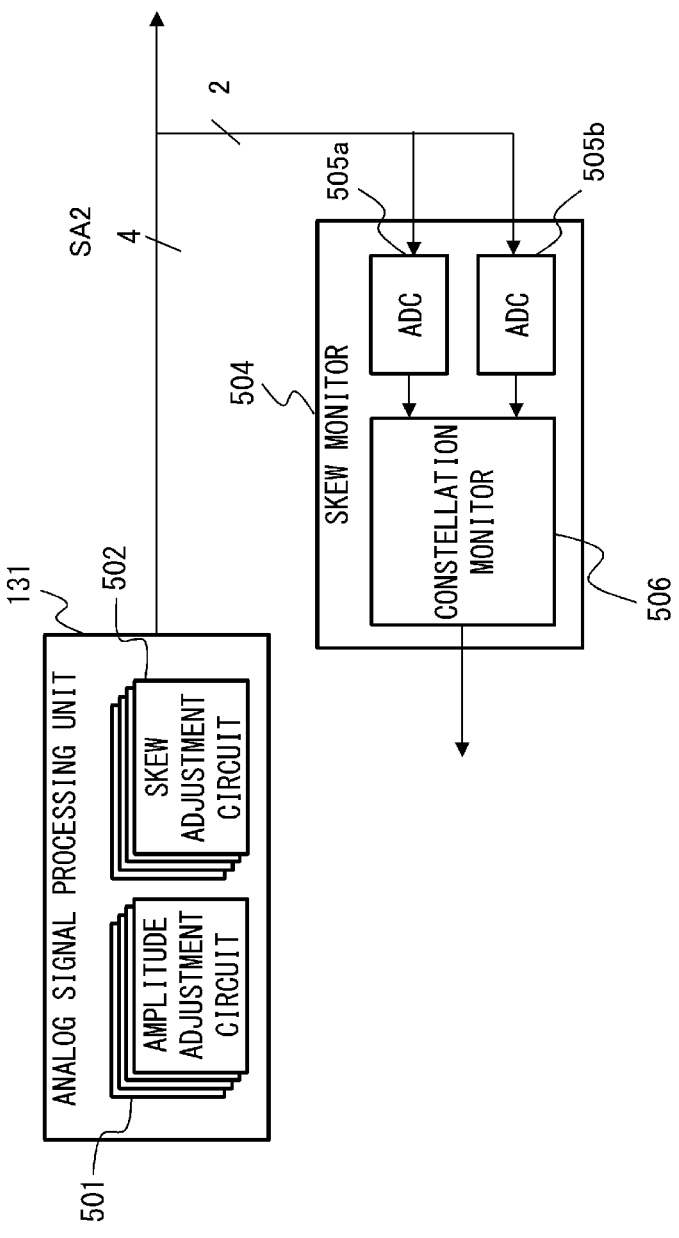
FIG. 27 is a configuration diagram illustrating an example of a configuration of a skew monitor according to the fourth example embodiment.

FIG. 27 illustrates an example of a configuration of the skew monitor 504 according to the present example embodiment. In this example, constellation of the analog electric signal SA2 is monitored and the skew is adjusted according to a pattern of the constellation. As illustrated in FIG. 27, the skew monitor 504 includes ADCs 505a and 505b and a constellation monitor 506.

The ADC 505a samples the I component (XI or YI) of the analog electric signal SA2 and performs AD conversion. The ADC 505b samples the Q component (XQ or YQ) of the analog electric signal SA2 and performs AD conversion. The constellation monitor 506 monitors the constellation of the analog electric signal SA2 by the AD-converted I and Q components.

Figure 28A:
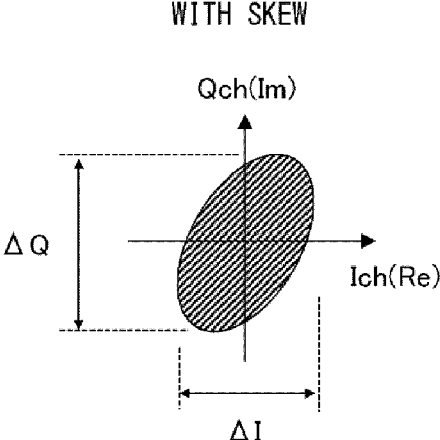
FIG. 28A is a characteristic diagram illustrating an example of skew monitoring according to the fourth example embodiment.
Figure 28B:
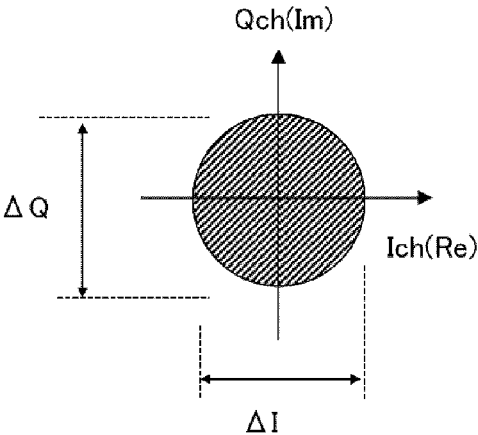
FIG. 28B is a characteristic diagram illustrating an example of skew monitoring according to the fourth example embodiment.

The control unit 132 controls the skew adjustment circuit 502 according to the monitoring result of the constellation of the analog electric signal SA2. FIG. 28A illustrates a constellation in a case where there is a skew and FIG. 28B illustrates a constellation in a case where there is no skew. As illustrated in FIG. 28A, in the case where there is a skew, a shape (pattern) of the constellation is an ellipse. The constellation is a ellipse when there is a difference between the amplitudes of the I signal and the Q signal or when there is a skew, but in this example, since a difference in amplitude is compensated in advance by the amplitude monitor and the amplitude adjustment circuit, the presence or absence of skew can be determined based on whether or not the constellation of the analog electric signal SA2 is an ellipse.

Therefore, when the constellation is an ellipse as illustrated in FIG. 28A, a delay amount of the skew adjustment circuit 502 is controlled in such a way that the constellation becomes a true circle as illustrated in FIG. 28B. A degree of ellipse (for example, a difference between a major axis and a minor axis) is monitored, and the delay of the I component and the Q component is controlled in such a way as to be a true circle. For example, a length $\Delta Q$ of the constellation in a Q-axis direction is compared with a length $\Delta I$ of the constellation in an I-axis direction, and a difference between $\Delta Q$ and $\Delta I$ is controlled in such a wat as to be small. For example, the delay amount of either the Q signal or the I signal is gradually increased (or decreased), and $\Delta Q$ and $\Delta I$ are adjusted in such a way as to be equal.

As described above, in the present example embodiment, a variation in the amplitude of the pre-signal of the analog signal processing unit is monitored, the amplitude compensation is performed by the analog signal processing unit according to the monitoring result, the skew of the post-signal of the analog signal processing unit is monitored, and the skew compensation is performed by the analog signal processing unit according to the monitoring result. As a result, it is possible to transmit an optical signal that has been appropriately subjected to amplitude compensation and skew compensation in the analog signal processing unit, and it is possible to suppress signal quality deterioration due to skew and amplitude variation inside the optical relay apparatus.

Modified Example of Fourth Example Embodiment

Figure 29:
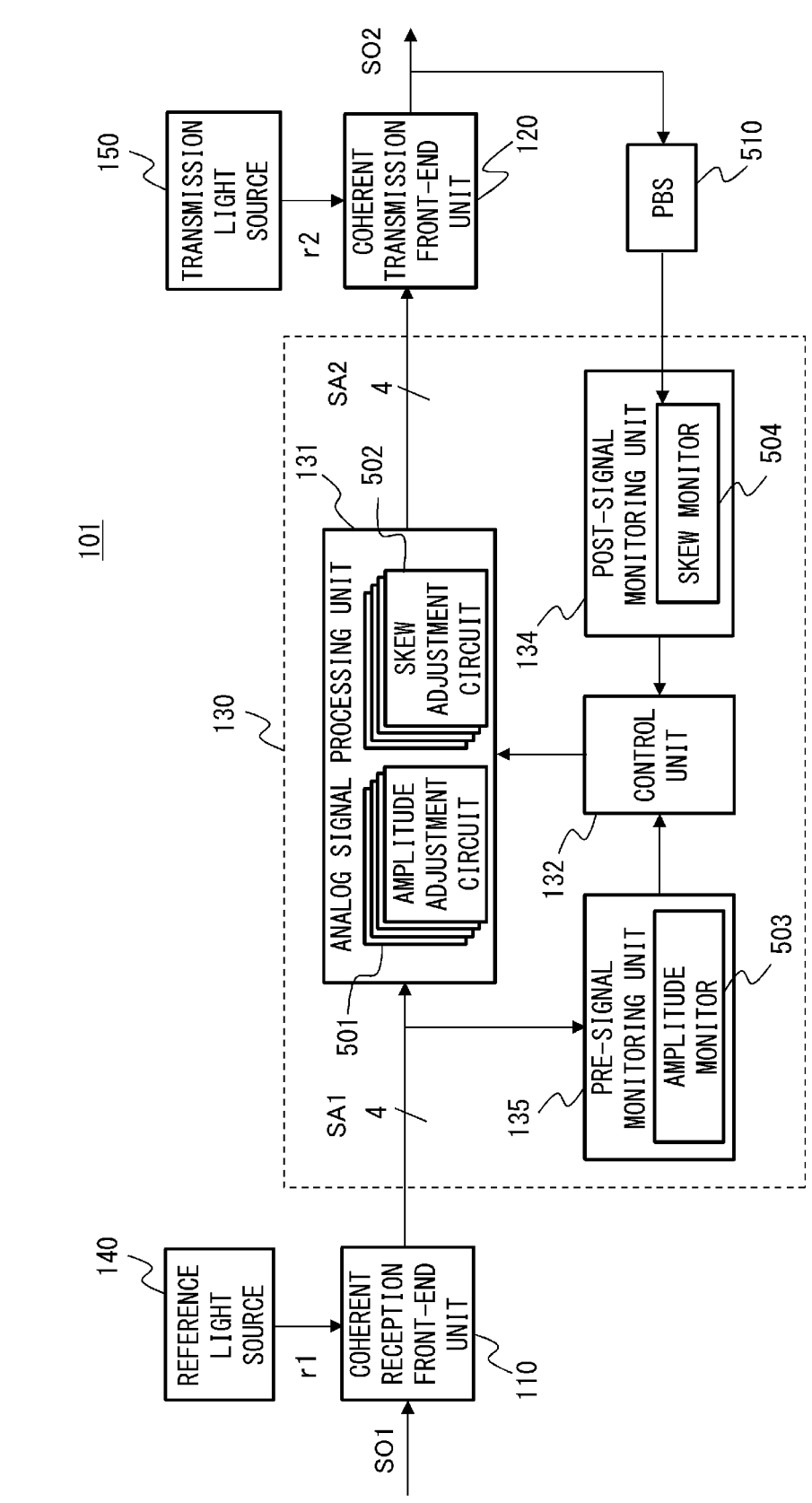
FIG. 29 is a configuration diagram illustrating an example of a configuration of an optical transceiver according to a modified example of the fourth example embodiment.

FIG. 29 illustrates a configuration of a modified example of the fourth example embodiment. In the fourth example embodiment, the analog electric signal SA2 between the analog signal processing unit 131 and the coherent transmission front-end unit 120 is monitored, but as illustrated in FIG. 29, an output optical signal SO2, which is an output of the coherent transmission front-end unit 120, may be branched and monitored. For example, a skew monitor 504 monitors an optical signal of the X polarization or Y polarization, which is separated by a polarization beam splitter (PBS) 510.

Figure 30:
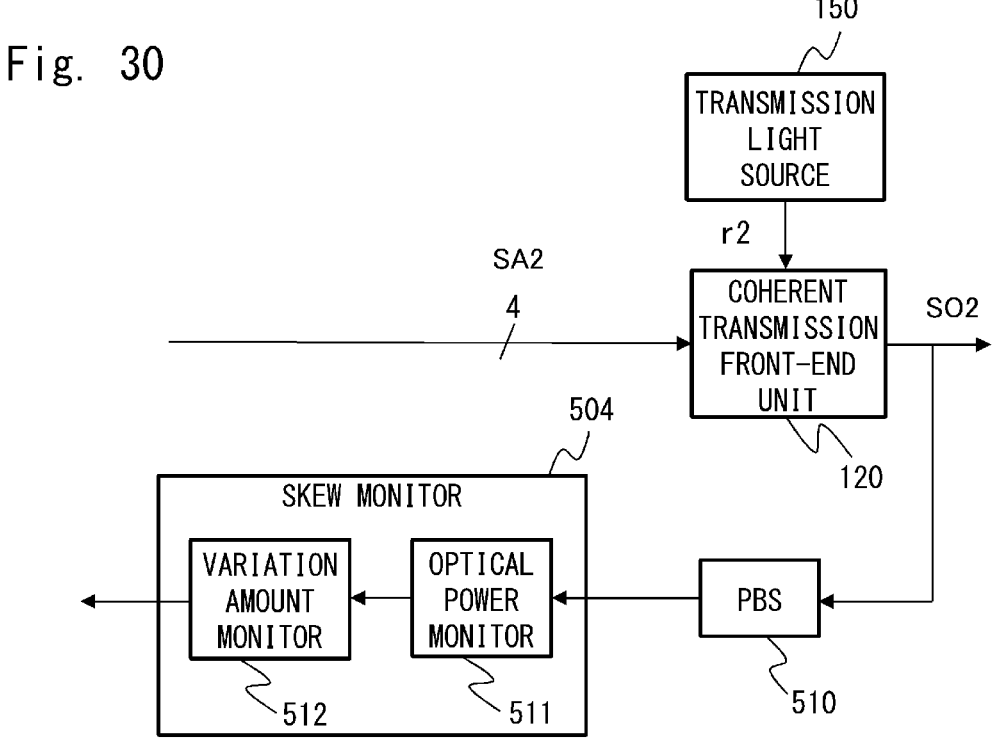
FIG. 30 is a configuration diagram illustrating an example of a configuration of a skew monitor according to the modified example of the fourth example embodiment.

FIG. 30 illustrates an example of a configuration of a skew monitor 504 according to a modified example of the fourth example embodiment. In this example, an intensity of the output optical signal is monitored, and the skew is adjusted according to an amount of variation in the intensity of the output optical signal.

As illustrated in FIG. 30, the skew monitor 504 includes an optical power monitor 511 and a variation amount monitor 512. The optical power monitor 511 monitors the power of the X polarization or the Y polarization of the output optical signal SO2. The variation amount monitor 512 monitors a fluctuation amount of power of the X polarization or the Y polarization of the output optical signal SO2.

Figure 31A:
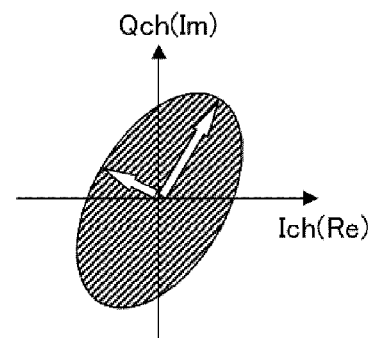
FIG. 31A is a characteristic diagram illustrating an example of skew monitoring according to the modified example of the fourth example embodiment.
Figure 31B:
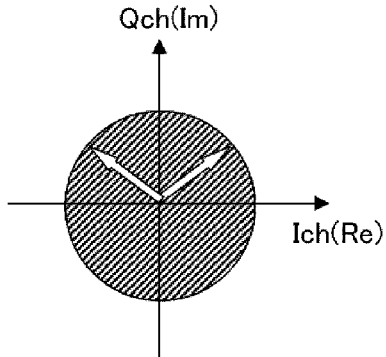
FIG. 31B is a characteristic diagram illustrating an example of skew monitoring according to the modified example of the fourth example embodiment.
Figure 32A:
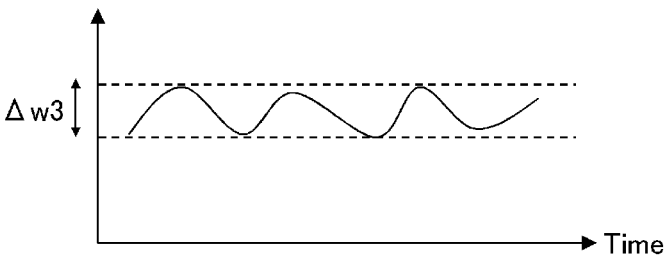
FIG. 32A is a signal waveform diagram illustrating an example of skew monitoring according to the modified example of the fourth example embodiment.
Figure 32B:
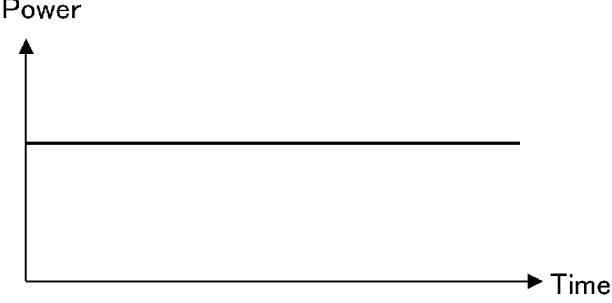
FIG. 32B is a signal waveform diagram illustrating an example of skew monitoring according to the modified example of the fourth example embodiment.

The control unit 132 controls the skew adjustment circuit 502 according to the monitoring result of the variation amount of the power of the output optical signal SO2. FIGS. 31A and 31B illustrate constellations in cases where there is a skew and there is no skew, respectively. FIGS. 32A and 32B illustrate intensities of the optical signals in cases where there is a skew and there is no skew, respectively.

In the case where there is a skew, since the constellation becomes an ellipse as illustrated in FIG. 31A, the intensity of the optical signal fluctuates as illustrated in FIG. 32A. In the case where there is no skew, as illustrated in FIG. 31B, since the constellation becomes a true circle, as illustrated in FIG. 32B, the intensity of the optical signal becomes constant. Therefore, as illustrated in FIG. 32A, the skew is adjusted according to an amount $\Delta w3$ of variation in the intensity of the optical signal. For example, delay amounts of the I component and the Q component of the skew adjustment circuit 502 are controlled in such a way that the amount $\Delta w3$ of variation in the intensity becomes minimum and the intensity becomes constant.

Fifth Example Embodiment

Hereinafter, a fifth example embodiment will be explained with reference to the drawings. In the present example embodiment, an example in which skew is monitored by using a dither signal in the analog compensation unit of the fourth example embodiment will be explained.

Figure 33:
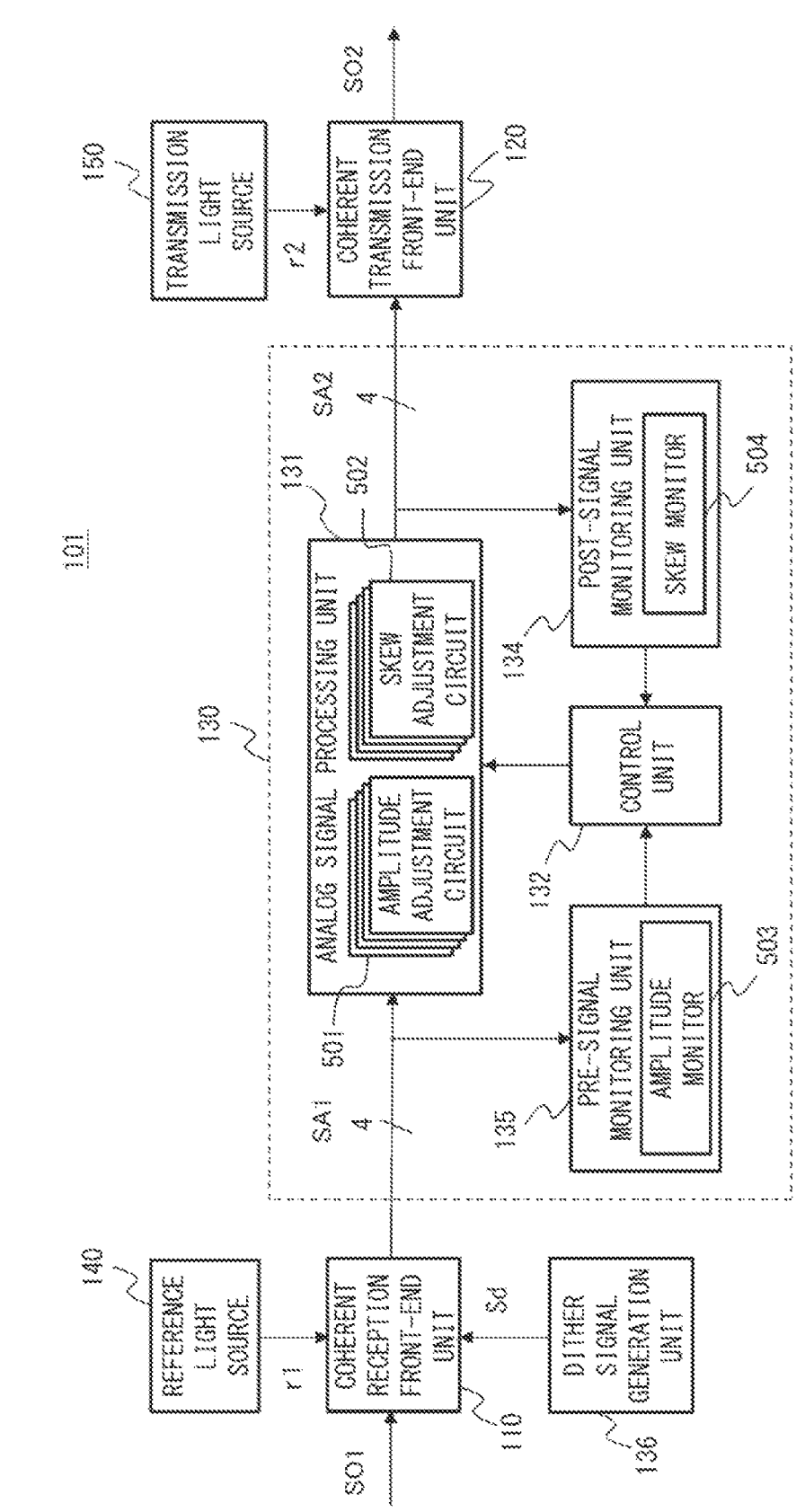
FIG. 33 is a configuration diagram illustrating an example of a configuration of an optical transceiver according to a fifth example embodiment.

FIG. 33 illustrates an example of a configuration of an optical transceiver 101 according to the present example embodiment. As illustrated in FIG. 33, the optical transceiver 101 includes a dither signal generation unit 136 in addition to the configuration of the fourth example embodiment. The dither signal generation unit (dither signal superimposition unit) 136 generates a dither signal Sd for skew detection, and applies (superimposes) a dither signal to an analog electric signal SA1 being output from a coherent reception front-end unit 110.

The dither signal is simultaneously applied to four lanes of the main signal (analog electric signal SA1) in the coherent reception front-end section 110, and is detected by a skew monitor 504 of a post-signal monitoring unit 134. A dither signal may be applied to the I and Q components of at least two lanes for skew detection. The dither signal is a signal of a predetermined frequency that does not affect the transmission of the main signal. For example, a frequency (band) of the dither signal is different from the frequency of the main signal (outside the band of the main signal) and is lower than the frequency of the main signal (separated by a predetermined frequency), such as 100 KHz or 50 KHz.

Figure 34:
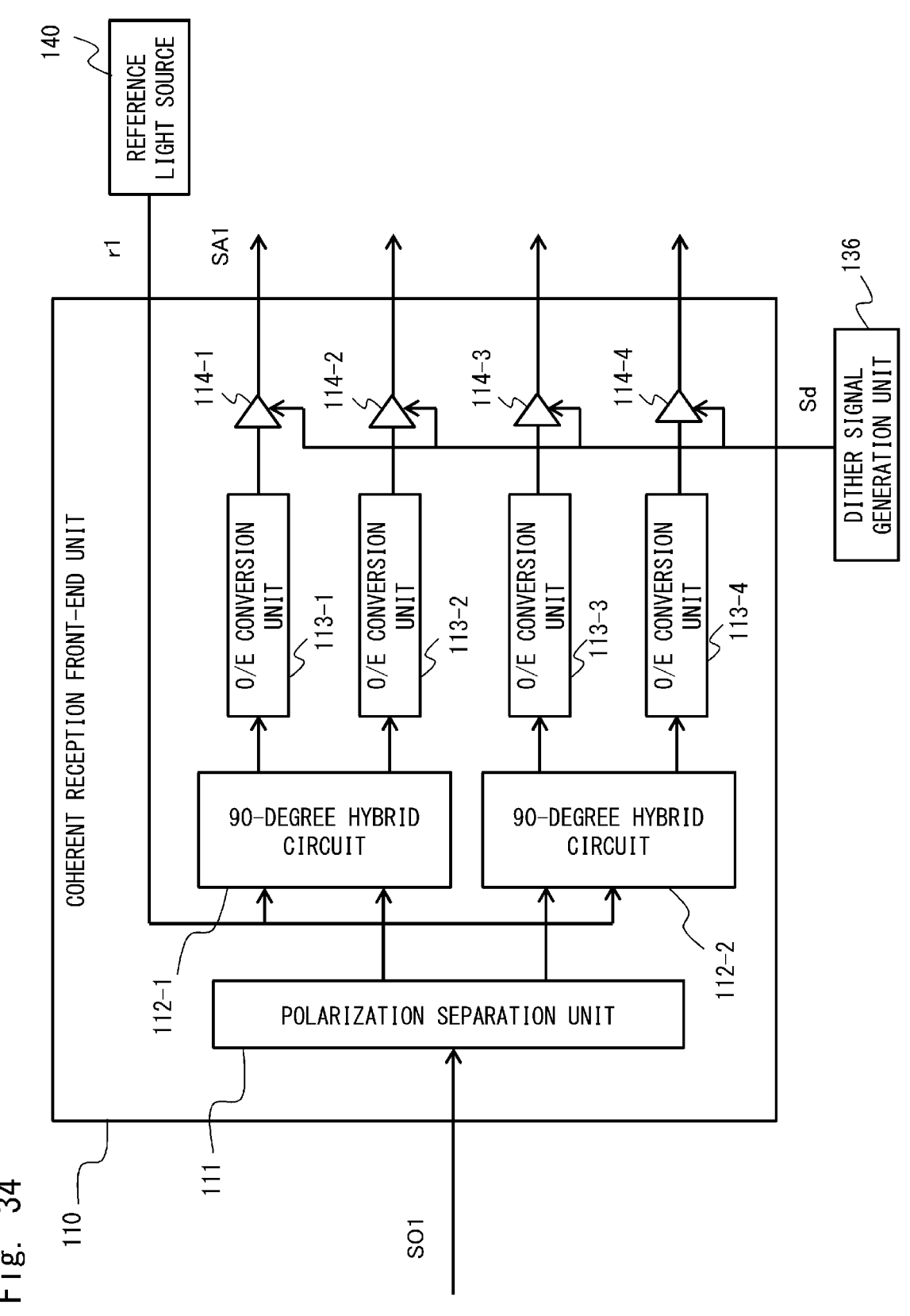
FIG. 34 is a configuration diagram illustrating an example of a configuration of a coherent reception front-end unit according to the fifth example embodiment.

FIG. 34 is an example of a configuration of the coherent reception front-end unit 110 according to the present example embodiment, and illustrates a specific example of applying a dither signal. As illustrated in FIG. 34, for example, a dither signal Sd is applied from the dither signal generation unit 136 to amplifiers 114-1 to 114-4 in an output stage of the coherent reception front-end unit 110. The dither signal may be applied (superimposed) by using the amplifiers 114-1 to 114-4 as Trans-Impedance AMPs (TIAs) capable of applying a dither signal. Further, the power supply of the Photo Diode (PD) constituting O/E conversion units 113-1 to 113-4 and the TIA power supply of the amplifiers 114-1 to 114-4 may be slightly swung, and dither signals may be superimposed on each other in four lanes at the same time.

Figure 35:
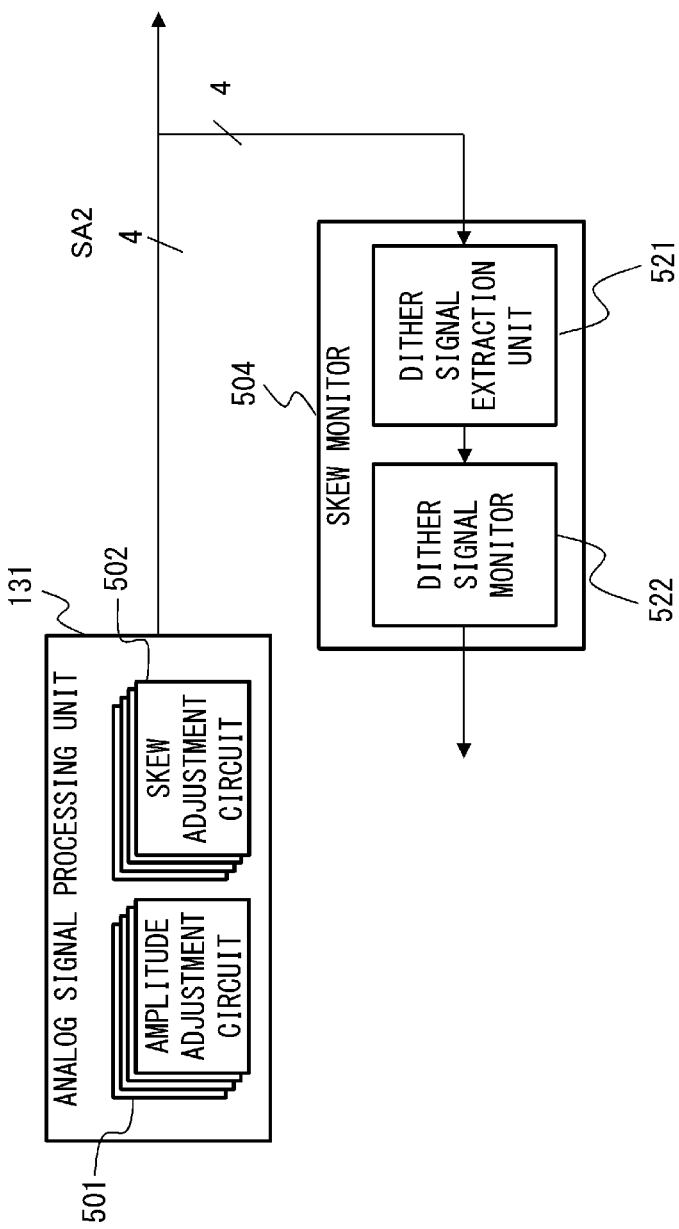
FIG. 35 is a configuration diagram illustrating an example of a configuration of a skew monitor according to the fifth example embodiment.

FIG. 35 illustrates an example of a configuration of the skew monitor 504 according to the present example embodiment. The skew monitor 504 monitors the skew of the dither signal superimposed by the coherent reception front-end unit 110. For example, the skew monitor 504 includes a dither signal extraction unit 521 and a dither signal monitor 522. The dither signal extraction unit 521 is a low-speed ADC, a low-pass filter, or the like, and extracts a low-frequency dither signal from a 4-lane (or 2-lane) signal of the analog electric signal SA2. The dither signal monitor 522 monitors skew by comparing the phases of the extracted four-lane (or two-lane) dither signals.

As described above, in the present example embodiment, when skew compensation is performed as in the fourth example embodiment, a dither signal for skew detection is applied by the coherent reception front-end unit, and skew is monitored by the post-signal monitoring unit. By using the dither signal as a low-frequency signal outside the band of the main signal, skew can be detected without affecting the main signal.

The present disclosure is not limited to the above-described example embodiments, and can be appropriately modified without departing from the scope of the present disclosure.

Although the present disclosure has been explained with reference to the example embodiments, the present disclosure is not limited to the above-described example embodiments. Various changes that can be understood by a person skilled in the art within the scope of the present disclosure can be made to the configuration and details of the present disclosure.

Some or all of the above-described example embodiments may be described as the following supplementary notes, but are not limited thereto.

(Supplementary Note 1)

An optical relay apparatus including:

a coherent optical reception front-end means for coherently detecting an input optical signal to be input, based on local oscillation light, and outputting the coherently detected first analog electric signal;

a coherent optical transmission front-end means for coherently modulating a second analog electric signal acquired by turning around the first analog electric signal, based on transmission light, and outputting the coherently modulated output optical signal; and an analog compensation means for performing analog signal processing on the first analog electric signal in such a way as to compensate for signal quality according to a signal characteristic between an input of the coherent optical reception front-end means and an output of the coherent optical transmission front-end means, and thereby generating the second analog electric signal.

(Supplementary Note 2)

The optical relay apparatus according to Supplementary note 1, wherein the signal characteristic includes a characteristic of a polarization signal or a characteristic of a complex signal.

(Supplementary Note 3)

The optical relay apparatus according to Supplementary note 1 or 2, wherein the compensation of the signal quality includes any of band compensation, frequency offset compensation, skew compensation, and amplitude compensation.

(Supplementary Note 4)

The optical relay apparatus according to any one of Supplementary notes 1 to 3, wherein the analog compensation means includes:

an analog signal processing unit configured to perform the analog signal processing;

a monitoring unit configured to monitor signal characteristics of any of the input optical signal, the first analog electric signal, the second analog electric signal, and the output optical signal; and a control unit configured to control an operation of the analog signal processing, based on a result of the monitoring.

(Supplementary Note 5)

The optical relay apparatus according to Supplementary note 4, wherein the monitoring unit monitors a frequency characteristic of the second analog electric signal, and the control unit controls output power for each band in the analog signal processing, based on the monitored frequency characteristic.

(Supplementary Note 6)

The optical relay apparatus according to Supplementary note 5, wherein the monitoring unit monitors power of the first band and the power of a second band in the second analog electric signal, and the control unit controls output power of the first band or the second band of the analog signal processing in such a way that the power of the first band and the power of the second band become equal.

(Supplementary Note 7)

The optical relay apparatus according to any one of Supplementary notes 4 to 6, wherein the monitoring unit monitors a frequency offset of the local oscillation light by the first analog electric signal or the input optical signal, and the control unit controls a frequency of the local oscillation light, based on the monitored frequency offset.

(Supplementary Note 8)

The optical relay apparatus according to Supplementary note 7, wherein the monitoring unit monitors bilateral asymmetry with respect to a center frequency of a frequency spectrum of the first analog electric signal, and the control unit controls a frequency of the local oscillation light in such a way that the frequency spectrum is bilaterally target with respect to a center frequency.

(Supplementary Note 9)

The optical relay apparatus according to Supplementary note 8, wherein the monitor unit includes:

an AD conversion means for converting the first analog electric signal into a digital signal;

a complex signal generation means for generating a complex signal from the converted digital signal;

an FFT processing means for performing FFT processing on the generated complex signal; and an asymmetry monitoring unit configured to monitor asymmetry of a frequency spectrum acquired by the FFT processing.

(Supplementary Note 10)

The optical relay apparatus according to Supplementary note 8, wherein the monitoring unit includes:

a power monitoring means for monitoring power of each band of the first analog electric signal;

a spectrum generation means for generating a frequency spectrum, based on the monitored power; and an asymmetry monitoring unit configured to monitor asymmetry of the generated frequency spectrum.

(Supplementary Note 11)

The optical relay apparatus according to Supplementary note 10, wherein the monitoring unit monitors the asymmetry of the frequency spectrum, based on power of a first band and power of a second band in the first analog electric signal, and the control unit controls a frequency of the local oscillation light in such a way that the power of the first band and the power of the second band become equal.

(Supplementary Note 12)

The optical relay apparatus according to Supplementary note 7, wherein the monitoring unit monitors a frequency offset of the local oscillation light, based on a spectrum of the input optical signal and a spectrum of the local oscillation light.

(Supplementary Note 13)

The optical relay apparatus according to Supplementary note 12, wherein the monitoring unit includes:

an input optical power monitoring means for monitoring power of each band of the input optical signal;

an input optical spectrum generation means for generating a frequency spectrum, based on the monitored power of the input optical signal;

a local oscillation light power monitoring means for monitoring power of each band of the local oscillation light;

a local oscillation light spectrum generation means for generating a frequency spectrum, based on the monitored power of the local oscillation light; and a spectrum comparison unit configured to compare a frequency spectrum of the generated input optical signal with a frequency spectrum of local oscillation light, and monitor a frequency offset.

(Supplementary Note 14)

The optical relay apparatus according to any one of Supplementary notes 4 to 13, wherein the monitoring unit monitors amplitude of the first analog electric signal, and the control unit controls, based on the monitored amplitude, an output amplitude in the analog signal processing.

(Supplementary Note 15)

The optical relay apparatus according to any one of Supplementary notes 4 to 14, wherein the monitoring unit monitors skew of the second analog electric signal or the output optical signal, and the control unit controls a delay of a signal in the analog signal processing, based on the monitored skew.

(Supplementary Note 16)

The optical relay apparatus according to Supplementary note 15, wherein the monitoring unit monitors a constellation of the second analog electric signal, and the control unit controls a delay of a signal in the analog signal processing, based on a pattern of the constellation.

(Supplementary Note 17)

The optical relay apparatus according to Supplementary note 15, wherein the monitoring unit monitors power of the output optical signal, and the control unit controls a delay of a signal in the analog signal processing, based on the amount of variation in the power.

(Supplementary Note 18)

The optical relay apparatus according to Supplementary note 15, further comprising a superimposition means for superimposing a dither signal on the first analog electric signal being output from the coherent optical reception front-end means, wherein the monitoring unit monitors skew, based on the dither signal extracted from the second analog electric signal.

(Supplementary Note 19)

The optical relay apparatus according to Supplementary note 18, wherein a frequency of the dither signal is different from a frequency of the first analog electric signal and the second analog electric signal.

(Supplementary Note 20)

The optical relay apparatus according to any one of Supplementary notes 1 to 19, wherein a frequency of the local oscillation light is different from a frequency of the transmission light.

(Supplementary Note 21)

An optical transmission system including a plurality of optical relay apparatuses, wherein the plurality of optical relay apparatuses include:

a coherent optical reception front-end means for coherently detecting an input optical signal being input from the optical relay apparatus in a preceding stage, based on local oscillation light, and outputting the coherently detected first analog electric signal;

25 a coherent optical transmission front-end means for coherently modulating a second analog electric signal acquired by turning around the first analog electric signal, based on transmission light and outputting the coherently modulated output optical signal to the optical relay apparatus in a next stage; and an analog compensation means for performing analog signal processing on the first analog electric signal in such a way as to compensate for signal quality accord- ing to a signal characteristic between an input of the coherent optical reception front-end means and an output of the coherent optical transmission front-end means, and thereby generating the second analog elec- tric signal.

(Supplementary Note 22)

An optical relay method in an optical relay apparatus including a coherent optical reception front-end means and a coherent optical transmission front-end means, the optical relay method including:

by the coherent optical reception front-end means, coherently detecting an input optical signal to be input, based on local oscillation light, and outputting the coherently detected first analog electric signal;

by the coherent optical transmission front-end means, coherently modulating a second analog electric signal acquired by turning around the first analog electric signal, based on transmission light, and outputting the coherently modulated output optical signal; and performing analog signal processing on the first analog electric signal in such a way as to compensate for signal quality according to a signal characteristic between an input of the coherent optical reception front-end means and an output of the coherent optical transmission front-end means, thereby generating the second analog electric signal.

REFERENCE SIGNS LIST

1 OPTICAL TRANSMISSION SYSTEM
2 OPTICAL RELAY APPARATUS
3 OPTICAL FIBER TRANSMISSION LINE
4, 5 DATA CENTER
6 IT SERVICE PROVIDER
7, 8 EVENT VENUE
100 TRANSMITTING AND RECEIVING UNIT
101 OPTICAL TRANSCEIVER
102 DIGITAL COHERENT OPTICAL TRANSCEIVER
110 COHERENT RECEPTION FRONT-END UNIT
111 POLARIZATION SEPARATION UNIT
112 90-DEGREE HYBRID CIRCUIT
113 O/E CONVERSION UNIT
114 AMPLIFIER
120 COHERENT TRANSMISSION FRONT-END UNIT
121 AMPLIFIER
122 MZ MODULATOR
123 POLARIZATION COMBINING UNIT
130 ANALOG COMPENSATION UNIT
131 ANALOG SIGNAL PROCESSING UNIT
132 CONTROL UNIT
133 MONITORING UNIT
134 POST-SIGNAL MONITORING UNIT
135 PRE-SIGNAL MONITORING UNIT
136 DITHER SIGNAL GENERATION UNIT
140 REFERENCE LIGHT SOURCE
150 TRANSMISSION LIGHT SOURCE
200 OPTICAL SWITCH UNIT
201 DEMULTIPLEXER

26

202 MULTIPLEXER
203 BRANCH INSERTION UNIT
301 BAND ADJUSTMENT CIRCUIT
302 BAND MONITOR
303a, 303b BPF
304a, 304b POWER MONITOR
311 AGC AMPLIFIER
312 LPF
313 DELAY CIRCUIT
314 WEIGHTING CIRCUIT
315 ADDER CIRCUIT
316 DRIVER CIRCUIT
321 AMPLIFIER
322 BPF
323 VARIABLE GAIN AMPLIFIER
324 ADDER CIRCUIT
401 FREQUENCY OFFSET MONITOR
411 WIDEBAND ADC
412 COMPLEX SIGNAL CONVERSION UNIT
413 FFT UNIT
414 ASYMMETRIC MONITOR
421 LPF
422 POWER MONITOR
423 SPECTRUM RESTORATION UNIT
424 ASYMMETRIC MONITOR
431a, 431b VARIABLE OPTICAL BPF
432a, 432b OPTICAL POWER MONITOR
433a, 433b SPECTRUM RESTORATION UNIT
434 SPECTRUM COMPARISON UNIT
501 AMPLITUDE ADJUSTMENT CIRCUIT
502 SKEW ADJUSTMENT CIRCUIT
503 AMPLITUDE MONITOR
504 SKEW MONITOR
505a, 505b ADC
506 CONSTELLATION MONITOR
510 PBS
511 OPTICAL POWER MONITOR
512 VARIATION AMOUNT MONITOR
521 DITHER SIGNAL EXTRACTION UNIT
522 DITHER SIGNAL MONITOR

What is claimed is:

1. An optical relay apparatus comprising:

a coherent optical reception front-end unit configured to coherently detect an input optical signal to be input, based on local oscillation light, and to output the coherently detected first analog electric signal;

a coherent optical transmission front-end unit configured to coherently modulate a second analog electric signal acquired by turning around the first analog electric signal, based on transmission light, and to output the coherently modulated output optical signal; and an analog compensator configured to perform analog signal processing on the first analog electric signal in such a way as to compensate for signal quality accord- ing to a signal characteristic between an input of the coherent optical reception front-end unit and an output of the coherent optical transmission front-end unit, and thereby generate the second analog electric signal, wherein the analog compensator comprises:

an analog signal processor configured to perform the analog signal processing;

a monitor configured to monitor a signal characteristic of any of the input optical signal, the first analog electric signal, the second analog electric signal, and the output optical signal; and a controller configured to control an operation of the analog signal processing, based on a result of the monitoring.

2. The optical relay apparatus according to claim 1, wherein the signal characteristic comprises a characteristic of a polarization signal or a characteristic of a complex signal.

3. The optical relay apparatus according to claim 1, wherein the signal quality compensation comprises any of band compensation, frequency offset compensation, skew compensation, and amplitude compensation.

4. The optical relay apparatus according to claim 1, wherein:

the monitor is configured to monitor a frequency characteristic of the second analog electric signal, and the controller is configured to control output power of each band in the analog signal processing, based on the monitored frequency characteristic.

5. The optical relay apparatus according to claim 4, wherein:

the monitor is configured to monitor power of a first band and power of a second band in the second analog electric signal, and the controller is configured to control output power of the first band or the second band of the analog signal processing in such a way that the power of the first band and the power of the second band become equal.

6. The optical relay apparatus according to claim 1, wherein:

the monitor is configured to monitor a frequency offset of the local oscillation light by the first analog electric signal or the input optical signal, and the controller is configured to control a frequency of the local oscillation light, based on the monitored frequency offset.

7. The optical relay apparatus according to claim 6, wherein:

the monitor is configured to monitor bilateral asymmetry with respect to a center frequency of a frequency spectrum of the first analog electric signal, and the controller is configured to control a frequency of the local oscillation light in such a way that the frequency spectrum is bilaterally symmetrical with respect to a center frequency.

8. The optical relay apparatus according to claim 7, wherein the monitor comprises:

an AD convertor configured to convert the first analog electric signal into a digital signal;

a complex signal generator configured to generate a complex signal from the converted digital signal;

a FFT processor configured to perform FFT processing on the generated complex signal; and an asymmetry monitor configured to monitor asymmetry of a frequency spectrum acquired by the FFT processing.

9. The optical relay apparatus according to claim 7, wherein the monitor comprises:

a power monitor configured to monitor power of each band of the first analog electric signal;

a spectrum generator configured to generate a frequency spectrum, based on the monitored power; and an asymmetry monitor configured to monitor asymmetry of the generated frequency spectrum.

10. The optical relay apparatus according to claim 9, wherein:

the monitor is configured to monitor asymmetry of the frequency spectrum, based on power of a first band and power of a second band in the first analog electric signal, and the controller is configured to control a frequency of the local oscillation light in such a way that the power of the first band and the power of the second band become equal.

11. The optical relay apparatus according to claim 6, wherein the monitor is configured to monitor a frequency offset of the local oscillation light, based on a spectrum of the input optical signal and a spectrum of the local oscillation light.

12. The optical relay apparatus according to claim 11, wherein the monitor comprises:

an input optical power monitor configured to monitor power of each band of the input optical signal;

an input optical spectrum generator configured to generate a frequency spectrum, based on the monitored power of the input optical signal;

a local oscillation light power monitor configured to monitor power of each band of the local oscillation light;

a local oscillation light spectrum generator configured to generate a frequency spectrum, based on the monitored power of the local oscillation light; and a spectrum comparator configured to compare a frequency spectrum of the generated input optical signal with a frequency spectrum of local oscillation light, and monitoring a frequency offset.

13. The optical relay apparatus according to claim 1, wherein:

the monitor is configured to monitor an amplitude of the first analog electric signal, and the controller is configured to control an output amplitude in the analog signal processing, based on the monitored amplitude.

14. The optical relay apparatus according to claim 1, wherein:

the monitor is configured to monitor skew of the second analog electric signal or the output optical signal, and the controller is configured to control a delay of a signal in the analog signal processing, based on the monitored skew.

15. The optical relay apparatus according to claim 14, wherein:

the monitor is configured to monitor a constellation of the second analog electric signal, and the controller is configured to control a delay of a signal in the analog signal processing, based on a pattern of the constellation.

16. The optical relay apparatus according to claim 14, wherein:

the monitor is configured to monitor power of the output optical signal, and the controller is configured to control a delay of a signal in the analog signal processing, based on an amount of variation in the power.

17. The optical relay apparatus according to claim 14, further comprising a superimposer configured to superimpose a dither signal on the first analog electric signal being output from the coherent optical reception front-end unit, wherein the monitor is configured to monitor skew, based on the dither signal extracted from the second analog electric signal.

18. An optical transmission system comprising a plurality of optical relay apparatuses, wherein the plurality of optical relay apparatuses comprise:

a coherent optical reception front-end unit configured to coherently detect an input optical signal to be input from the optical relay apparatus in a preceding stage, based on local oscillation light, and to output the coherently detected first analog electric signal;

a coherent optical transmission front-end unit configured to coherently modulate a second analog electric signal acquired by turning around the first analog electric signal, based on transmission light, and to output the coherently modulated output optical signal to the optical relay apparatus in a next stage; and an analog compensator configured to perform analog signal processing on the first analog electric signal in such a way as to compensate for signal quality according to a signal characteristic between an input of the coherent optical reception front-end unit and an output of the coherent optical transmission front-end unit, and thereby generate the second analog electric signal, wherein the analog compensator comprises:

an analog signal processor configured to perform the analog signal processing;

a monitor configured to monitor a signal characteristic of any of the input optical signal, the first analog electric signal, the second analog electric signal, and the output optical signal; and a controller configured to control an operation of the analog signal processing, based on a result of the monitoring.

19. An optical relay method in an optical relay apparatus including a coherent optical reception front-end unit and a coherent optical transmission front-end unit, the optical relay method comprising:

by the coherent optical reception front-end unit, coherently detecting an input optical signal to be input, based on local oscillation light, and outputting the coherently detected first analog electric signal;

by the coherent optical transmission front-end unit, coherently modulating a second analog electric signal acquired by turning around the first analog electric signal, based on transmission light, and outputting the coherently modulated output optical signal;

performing analog signal processing on the first analog electric signal in such a way as to compensate for signal quality according to a signal characteristic between an input of the coherent optical reception front-end unit and an output of the coherent optical transmission front-end unit, thereby generating the second analog electric signal;

monitoring a signal characteristic of any of the input optical signal, the first analog electric signal, the second analog electric signal, and the output optical signal; and controlling an operation of the analog signal processing, based on a result of the monitoring.

\* \* \* \* \*